US011044652B2

(12) United States Patent
Zheng et al.

(10) Patent No.: US 11,044,652 B2
(45) Date of Patent: Jun. 22, 2021

(54) HANDOVER METHOD AND APPARATUS

(71) Applicant: HUAWEI TECHNOLOGIES CO., LTD., Guangdong (CN)

(72) Inventors: Xiuli Zheng, Beijing (CN); Xiaohu Xu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 10 days.

(21) Appl. No.: 16/442,968

(22) Filed: Jun. 17, 2019

(65) Prior Publication Data

US 2019/0306771 A1    Oct. 3, 2019

Related U.S. Application Data

(63) Continuation of application No. PCT/CN2017/119125, filed on Dec. 27, 2017.

(30) Foreign Application Priority Data

Jan. 25, 2017    (CN) .......................... 201710061365.9

(51) Int. Cl.
    *H04W 36/14*    (2009.01)
    *H04W 8/14*     (2009.01)
    (Continued)

(52) U.S. Cl.
    CPC ............. *H04W 36/14* (2013.01); *H04L 9/00* (2013.01); *H04W 8/14* (2013.01); *H04W 12/0431* (2021.01); *H04W 12/0433* (2021.01)

(58) Field of Classification Search
    None
    See application file for complete search history.

(56) References Cited

U.S. PATENT DOCUMENTS

| 8,144,687 B2* | 3/2012 | Bedekar | ............... H04W 40/24 |
| | | | 370/351 |
| 2003/0018810 A1* | 1/2003 | Karagiannis | ........... H04L 45/00 |
| | | | 709/238 |

(Continued)

FOREIGN PATENT DOCUMENTS

| CN | 1784059 A | 6/2006 |
| CN | 101001261 A | 7/2007 |

(Continued)

OTHER PUBLICATIONS

C. Vogt, "A comprehensive and efficient handoff procedure for IPv6 mobility support," 2006 International Symposium on a World of Wireless, Mobile and Multimedia Networks(WoWMoM'06), Buffalo-Niagara Falls, NY, 2006, p. 7 pp.-218, doi: 10.1109/WOWMOM. 2006.7. (Year: 2006).*

(Continued)

*Primary Examiner* — Ayaz R Sheikh
*Assistant Examiner* — Tarell A Hampton
(74) *Attorney, Agent, or Firm* — Womble Bond Dickinson (US) LLP

(57) ABSTRACT

Embodiments of the present disclosure disclose a handover method and an apparatus, so as to reduce a handover delay in a process of handing over an MN from a previous access network to a new access network. The method includes: sending, by the MN, first instruction information to a NAR by using a PAR, where the first instruction information is used to instruct the NAR to construct a care-of test initialization message and send the care-of test initialization message to a CN, and the care-of test initialization message includes an NCoA of the MN and is used to request a care-of keygen token from the CN based on the NCoA; handing over the MN from the PAR to the NAR; receiving, by the MN, the care-of keygen token sent by the NAR from the CN;

(Continued)

and binding the MN with the CN based on the care-of keygen token.

12 Claims, 12 Drawing Sheets

(51) Int. Cl.
*H04L 9/00* (2006.01)
*H04W 12/0431* (2021.01)
*H04W 12/0433* (2021.01)

(56) References Cited

U.S. PATENT DOCUMENTS

| | | | |
|---|---|---|---|
| 2004/0213181 A1* | 10/2004 | Grech | H04W 40/36 370/331 |
| 2004/0236937 A1* | 11/2004 | Perkins | H04L 63/12 713/150 |
| 2005/0008032 A1 | 1/2005 | Yamamoto et al. | |
| 2005/0044362 A1* | 2/2005 | Haddad | H04W 8/04 713/170 |
| 2005/0135241 A1* | 6/2005 | Hippelainen | H04L 63/0236 370/229 |
| 2005/0163080 A1* | 7/2005 | Suh | H04W 36/0016 370/331 |
| 2005/0175002 A1* | 8/2005 | Le | H04W 8/082 370/389 |
| 2006/0029020 A1* | 2/2006 | Jung | H04W 40/36 370/331 |
| 2006/0198372 A1* | 9/2006 | Lee | H04W 36/0011 370/389 |
| 2006/0251022 A1* | 11/2006 | Zhang | H04W 36/12 370/331 |
| 2007/0025309 A1* | 2/2007 | Yano | H04L 69/167 370/338 |
| 2007/0242638 A1* | 10/2007 | Arkko | H04W 12/0609 370/331 |
| 2007/0291790 A1* | 12/2007 | Ue | H04L 47/822 370/468 |
| 2008/0019318 A1* | 1/2008 | Akram | H04L 29/1232 370/331 |
| 2008/0062924 A1* | 3/2008 | Kasapidis | H04W 40/02 370/331 |
| 2008/0192758 A1* | 8/2008 | Mahkonen | H04W 8/082 370/401 |
| 2008/0253329 A1* | 10/2008 | Asou | H04W 36/0016 370/331 |
| 2008/0273500 A1* | 11/2008 | Suh | H04W 36/0011 370/331 |
| 2008/0291885 A1 | 11/2008 | Miao et al. | |
| 2009/0129314 A1* | 5/2009 | Weniger | H04L 63/0407 370/328 |
| 2010/0040017 A1* | 2/2010 | Shin | H04W 36/0011 370/331 |
| 2010/0296481 A1* | 11/2010 | Weniger | H04W 12/1204 370/331 |
| 2012/0110326 A1 | 5/2012 | Rossi | |

FOREIGN PATENT DOCUMENTS

| | | |
|---|---|---|
| CN | 101043727 A | 9/2007 |
| CN | 104135747 A | 11/2014 |
| KR | 20090001009 A | 1/2009 |
| WO | 2008026977 A1 | 3/2008 |

OTHER PUBLICATIONS

K. D. Wong, "Smarter route optimization for mobile IP," 2005 IEEE 16th International Symposium on Personal, Indoor and Mobile Radio Communications, Berlin, 2005, pp. 1550-1554 vol. 3, doi: 10.1109/PIMRC.2005.1651704. (Year: 2005).*

H. Fathi, S. S. Chakraborty and R. Prasad, "Optimization of Mobile IPv6-Based Handovers to Support VoIP Services in Wireless Heterogeneous Networks," in IEEE Transactions on Vehicular Technology, vol. 56, No. 1, pp. 260-270, Jan. 2007, doi: 10.1109/TVT.2006.883806. (Year: 2007).*

Yong Li, Wentao Chen, Depeng Jin and Lieguang Zeng, "Seamless handoff scheme for real-time application in the wireless IPv6 networking," 2008 2nd International Conference on Anti-counterfeiting, Security and Identification, Guiyang, 2008, pp. 136-139 (Year: 2008).*

V. P. Kafle, E. Kamioka and S. Yamada, "Extended Correspondent Registration Scheme for Reducing Handover Delay in Mobile IPv6," 7th International Conference on Mobile Data Management (MDM'06), Nara, Japan, 2006, pp. 110-110, doi: 10.1109/MDM.2006.85. (Year: 2006).*

C. Vogt, R. Bless, M. Doll and T. Kuefner, "Early binding updates for mobile IPv6," IEEE Wireless Communications and Networking Conference, 2005, New Orleans, LA, 2005, pp. 1440-1445 vol. 3, doi: 10.1109/WCNC.2005.1424727. (Year: 2005).*

Shah PA, Hasbullah HB, Lawai IA, Aminu Mu'azu A, Tang Jung L. A TOTP-based enhanced route optimization procedure for mobile IPv6 to reduce handover delay and signalling overhead. ScientificWorldJournal. 2014;2014:506028. Published Feb. 9, 2014. doi: 10.1155/2014/506028 (Year: 2014).*

Mun, Youngsong & Lee, Kyunghye & Ryu, Seonggeun & Shin, Teail. (2007). Using Return Routability for Authentication of Fast Handovers in Mobile IPv6. 1052-1061. 10.1007/978-3-540-74477-1_94 (Year: 2007).*

Jorge Espi et al: "Proactive Route Optimization for Fast Mobile IPv6", Vehicular Technology Conference Fall (VTC 2009—Fall), 2009 IEEE 70TH, IEEE, Sep. 2009, pp. 1-5, XP031600293.

Espi R Atkinson University of Strathcl Yoe J: "Proactive Route Optimization for FMIPv6; draft-espi-ietf-mipshop-profmipv6- 00.txt", Standardworkingdraft, Mar. 23, 2010. pp. 1-15, XP015067144.

F. Z. Yousaf et al. Proactive Bindings for FMIPv6, draft-yousaf-ietf-mipshop-pbfmipv6-00, Dec. 7, 2007. total 27 pages.

J. Arkko et al. Enhanced Route Optimization for Mobile IPv6, Network Working Group, RFC4866, May 2007. total 54 pages.

* cited by examiner

HANDOVER METHOD AND APPARATUS

CROSS-REFERENCE TO RELATED APPLICATIONS

This application is a continuation of International Application No. PCT/CN2017/119125, filed on Dec. 27, 2017, which claims priority to Chinese Patent Application No. 201710061365.9, filed on Jan. 25, 2017. The disclosures of the aforementioned applications are hereby incorporated by reference in their entireties.

TECHNICAL FIELD

This disclosure relates to the communications field, and in particular, to a handover method and an apparatus.

BACKGROUND

The Mobile Internet Protocol version 6 (MIPv6) provides a home address (HoA) and a care-of address (CoA) for a mobile node (MN). When moving to a foreign network, the MN may obtain a CoA supported by the foreign network. Then, the MN notifies a corresponding node (CN) of a mapping relationship between the HoA and the CoA, so that the CN can learn of the CoA and then be bound with the MN. Therefore, the MN can communicate with the CN by using the CoA.

When the MN is in a previous access network, the MN may communicate with the CN by using a previous access router (PAR) in the previous access network. When the MN is handed over from the previous access network to a new access network, the MN first needs to be disconnected from the PAR in the previous access network, and establishes a connection to a new access router (NAR) in the new access network. Then, the MN obtains a new care-of address (NCoA) supported by the new access network, and uses the NCoA to be bound with the CN, so that the MN can use the NCoA to communicate with the CN by using the NAR. The previous access network may be a home network, and the new access network may be a foreign network. Alternatively, the previous access network may be a foreign network, and the new access network may be another foreign network.

In MIPv6, a handover delay includes a required time from a time point at which the MN is disconnected from the PAR to a time point at which the MN uses the NCoA to be bound with the CN. It may be understood that when the MN is handed over to the NAR but does not complete binding update with the CN, the CN keeps sending a data packet to a PCoA. After these data packets are routed to the PAR, a packet loss occurs.

This relatively greatly affects transmission performance of a service with a relatively high real-time requirement, for example, a Voice over Internet Protocol (VoIP) service. Therefore, reducing the handover delay is a problem to be resolved urgently.

SUMMARY

Embodiments of the present disclosure provide a handover method and an apparatus, so as to reduce a handover delay in a process of handing over an MN from a previous access network to a new access network.

According to a first aspect, a handover method is provided and may include: sending, by an MN, first instruction information to a NAR by using a PAR, where the first instruction information is used to instruct the NAR to construct a care-of test initialization message and send the care-of test initialization message to a corresponding node CN, and the care-of test initialization message includes a new care-of address NCoA of the MN and is used to instruct the CN to construct a care-of keygen token based on the NCoA; handing over the MN from the PAR to the NAR; receiving, by the MN, the care-of keygen token sent by the NAR from the CN; and binding the MN with the CN based on the care-of keygen token. In this case, in this embodiment of the present disclosure, before the MN is handed over from the PAR to the NAR, the NAR is instructed to construct the care-of test initialization message to obtain the care-of keygen token. Therefore, after the MN is handed over from the PAR to the NAR, the MN may directly receive the care-of keygen token sent by the NAR, and the MN does not need to send the care-of test initialization message to the CN to obtain the care-of keygen token. In this way, compared with the prior art, in this embodiment of the present disclosure, a binding update delay is reduced by reducing a care-of test initialization message delay, thereby reducing a handover delay.

In a first possible implementation of the first aspect, the sending, by an MN, first instruction information to a NAR by using a PAR may include: sending, by the MN, a fast binding update FBU message to the PAR, where the FBU message includes the first instruction information, the FBU message is used to instruct the PAR to send a handover initiate HI message to the NAR, and the HI message includes the first instruction information. In this case, the first instruction information is carried in the FBU message and the HI message in a process of verifying validity of the NCoA, and is sent by the MN to the NAR by using the PAR. In this way, signaling overheads can be reduced.

In a specific implementation, the first instruction information may alternatively be carried in a new message and the new message is sent by the MN to the PAR; and then, the first instruction information is carried in another new message and the another new message is sent by the PAR to the NAR. The first instruction information may further be carried in the FBU message and the FBU message is sent by the MN to the PAR; and then, the first instruction information is carried in a new message and the new message is sent by the PAR to the NAR. In addition, the process in which the NAR verifies the validity of the NCoA and a process in which the MN sends the first instruction information to the NAR by using the PAR may alternatively be separately performed. For example, the first instruction information may further be carried in a new message and the new message is sent by the MN to the PAR; and then, the first instruction information is carried in the HI message and the HI message is sent by the PAR to the NAR. A specific implementation of any of the foregoing new messages is not limited in this embodiment of the present disclosure.

With reference to the first aspect or the first possible implementation of the first aspect, in a second possible implementation of the first aspect, before the handing over the MN from the PAR to the NAR, the method may further include: obtaining, by the MN, a home address HoA authentication parameter; and the binding the MN with the CN based on the care-of keygen token may include: binding the MN with the CN based on the care-of keygen token and the HoA authentication parameter.

With reference to the second possible implementation of the first aspect, in a third possible implementation of the first aspect, the obtaining, by the MN, an HoA authentication parameter may include: locally obtaining, by the MN, a CGA parameter and a CGA signature; or locally obtaining, by the MN, a permanent home keygen token; or sending, by the MN, a home test initialization message to the CN by using a home agent, and receiving a home test message sent by the home agent from the CN, where the home test message includes a home keygen token. In this way, when the MN locally includes the HoA authentication parameter, the MN may not need to send the home test initialization message to the CN to obtain the home keygen token constructed by the CN, thereby reducing overheads of the MN.

With reference to the third possible implementation of the first aspect, in a fourth possible implementation of the first aspect, the locally obtaining, by the MN, a permanent home keygen token may include: obtaining, by the MN, the permanent home keygen token from a locally stored binding update list, where the binding update list includes information about the binding between the MN and the CN.

According to a second aspect, a handover method is provided and may include: receiving, by a PAR, first instruction information sent by an MN, where the first instruction information is used to instruct a NAR to construct a care-of test initialization message and send the care-of test initialization message to a CN, and the care-of test initialization message includes an NCoA of the MN and is used to instruct the CN to construct a care-of keygen token based on the NCoA; sending, by the PAR, the first instruction information to the NAR; and disconnecting the PAR from the MN, so that the MN is connected to the NAR, receives the care-of keygen token sent by the NAR, and is further bound with the CN based on the care-of keygen token.

In a first possible implementation of the second aspect, the receiving, by a PAR, first instruction information sent by an MN may include: receiving, by the PAR, a fast binding update FBU message sent by the MN, where the FBU message includes the first instruction information; and the sending, by the PAR, the first instruction information to the NAR includes: sending, by the PAR, a handover initiate HI message to the NAR based on the FBU message, where the HI message includes the first instruction information.

According to a third aspect, a handover method is provided and may include: receiving, by a NAR, first instruction information sent by a PAR; sending, by the NAR, a care-of test initialization message to a CN based on the first instruction information, where the care-of test initialization message includes an NCoA of an MN and is used to instruct the CN to construct a care-of keygen token based on the NCoA; receiving, by the NAR, the care-of keygen token sent by the CN; connecting the NAR to the MN; and sending, by the NAR, the care-of keygen token to the MN, so that the MN is bound with the CN based on the care-of keygen token.

In a first possible implementation of the third aspect, the receiving, by a NAR, first instruction information sent by a PAR may include: receiving, by the NAR, a handover initiate HI message sent by the PAR, where the HI message includes the first instruction information.

According to a fourth aspect, a handover method is provided and may include: receiving, by a CN, a care-of test initialization message sent by a NAR, where the care-of test initialization message includes an NCoA of a mobile node MN; constructing, by the CN, a care-of keygen token based on the NCoA of the MN; sending, by the CN, the care-of keygen token to the NAR, so that after the MN is connected to the NAR, the NAR sends the care-of keygen token to the MN; and binding the CN with the MN based on the care-of keygen token sent by the MN.

In a first possible implementation of the fourth aspect, the binding the CN with the MN based on the care-of keygen token sent by the MN may include: receiving, by the CN, a binding update message sent by the MN, where the binding update message includes the care-of keygen token and a home address HoA authentication parameter, the HoA authentication parameter includes a CGA parameter and a CGA signature, or the HoA authentication parameter includes a permanent home keygen token, or the HoA authentication parameter includes a home keygen token; and sending, by the CN, a binding acknowledgement message to the MN based on the binding update message.

For beneficial effects that can be achieved by using the handover methods provided in the second aspect, the third aspect, and the fourth aspect of the embodiments of the present disclosure, refer to beneficial effects in the handover method provided in the first aspect. Details are not described herein again.

According to a fifth aspect, an MN is provided. The MN may include: a sending module, configured to send first instruction information to a NAR by using a PAR, where the first instruction information is used to instruct the NAR to construct a care-of test initialization message and send the care-of test initialization message to a CN, and the care-of test initialization message includes an NCoA and is used to instruct the CN to construct a care-of keygen token based on the NCoA; a connection module, configured to switch from a connection to the PAR to a connection to the NAR; a receiving module, configured to receive the care-of keygen token sent by the NAR from the CN; and a binding module, configured to be bound with the CN based on the care-of keygen token. For beneficial effects that can be achieved by the MN provided in the fifth aspect of the embodiments of the present disclosure, refer to the first aspect. Details are not described herein again.

In a first possible implementation of the fifth aspect, the sending module is specifically configured to send an FBU message to the PAR, where the FBU message includes the first instruction information, the FBU message is used to instruct the PAR to send an HI message to the NAR, and the HI message includes the first instruction information.

With reference to the fifth aspect or the first possible implementation of the fifth aspect, in a second possible implementation of the fifth aspect, the MN may further include: an obtaining module, configured to obtain an HoA authentication parameter; and the binding module is specifically configured to be bound with the CN based on the care-of keygen token and the HoA authentication parameter.

With reference to the second possible implementation of the fifth aspect, in a third possible implementation of the fifth aspect, the obtaining module is specifically configured to: locally obtain a CGA parameter and a CGA signature; or locally obtain a permanent home keygen token; or send a home test initialization message to the CN by using a home agent, and receive a home test message sent by the home agent from the CN, where the home test message includes a home keygen token.

With reference to the third possible implementation of the fifth aspect, in a fourth possible implementation of the fifth aspect, the obtaining module is specifically configured to obtain the permanent home keygen token from a locally stored binding update list, where the binding update list includes information about the binding between the MN and the CN.

According to a sixth aspect, an MN is provided. The MN may implement a function performed in the handover method example provided in the first aspect, and the function may be implemented by using hardware, or may be implemented by hardware by executing corresponding software. The hardware or the software includes one or more modules corresponding to the foregoing function.

In a possible implementation of the sixth aspect, a structure of the MN includes a processor, a memory, a bus, and a communications interface. The processor is configured to support the MN in performing a corresponding function in the foregoing method. The communications interface is configured to support communication between the MN and another network element. The MN may further include the memory. The memory is configured to be coupled to the processor, and the memory stores a program instruction and data required by the MN. The communications interface may be specifically a transceiver.

According to a seventh aspect, a computer storage medium is provided, and configured to store a computer software instruction corresponding to the handover method provided in the first aspect. The computer software instruction includes a designed program used to perform the fifth aspect.

According to an eighth aspect, an access router is provided. The access router may include: a receiving module, configured to receive first instruction information sent by an MN, where the first instruction information is used to instruct a NAR to construct a care-of test initialization message and send the care-of test initialization message to a CN, and the care-of test initialization message includes a new care-of address NCoA of the MN and is used to instruct the CN to construct a care-of keygen token based on the NCoA; a sending module, configured to send the first instruction information to the NAR; and a connection module, configured to be disconnected from the MN, so that the MN is connected to the NAR, receives the care-of keygen token sent by the NAR, and is further bound with the CN based on the care-of keygen token. For beneficial effects that can be achieved by the access router provided in the eighth aspect of the embodiments of the present disclosure, refer to the second aspect. Details are not described herein again. The access router may be specifically a PAR.

In a first possible implementation of the eighth aspect, the receiving module is specifically configured to receive an FBU message sent by the MN, where the FBU message includes the first instruction information; and the sending module is specifically configured to: send an HI message to the NAR based on the FBU message, where the HI message includes the first instruction information.

According to a ninth aspect, an access router is provided. The access router may implement a function performed in the handover method example provided in the second aspect, and the function may be implemented by using hardware, or may be implemented by hardware by executing corresponding software. The hardware or the software includes one or more modules corresponding to the foregoing function.

In a possible implementation of the ninth aspect, a structure of the access router includes a processor, a memory, a bus, and a communications interface. The processor is configured to support the access router in performing a corresponding function in the foregoing method. The communications interface is configured to support communication between the access router and another network element. The access router may further include the memory. The memory is configured to be coupled to the processor, and the memory stores a program instruction and data required by the access router. The communications interface may be specifically a transceiver.

According to a tenth aspect, a computer storage medium is provided, and configured to store a computer software instruction corresponding to the handover method provided in the second aspect. The computer software instruction includes a designed program used to perform the eighth aspect.

According to an eleventh aspect, an access router is provided. The access router may include: a receiving module, configured to receive first instruction information sent by a PAR; a sending module, configured to send a care-of test initialization message to a CN based on the first instruction information, where the care-of test initialization message includes a new care-of address NCoA of an MN and is used to instruct the CN to construct a care-of keygen token based on the NCoA, where the receiving module is further configured to receive the care-of keygen token sent by the CN; and a connection module, configured to connect to the MN, where the sending module is further configured to send the care-of keygen token to the MN, so that the MN is bound with the CN based on the care-of keygen token. For beneficial effects that can be achieved by the access router provided in the ninth aspect of the embodiments of the present disclosure, refer to the third aspect. Details are not described herein again. The access router may be specifically a NAR.

In a first possible implementation of the eleventh aspect, the receiving module is further configured to receive an HI message sent by the PAR, where the HI message includes the first instruction information.

According to a twelfth aspect, an access router is provided. The access router may implement a function performed in the handover method example provided in the third aspect, and the function may be implemented by using hardware, or may be implemented by hardware by executing corresponding software. The hardware or the software includes one or more modules corresponding to the foregoing function.

In a possible implementation of the twelfth aspect, a structure of the access router includes a processor, a memory, a bus, and a communications interface. The processor is configured to support the access router in performing a corresponding function in the foregoing method. The communications interface is configured to support communication between the access router and another network element. The access router may further include the memory. The memory is configured to be coupled to the processor, and the memory stores a program instruction and data required by the access router. The communications interface may be specifically a transceiver.

According to a thirteenth aspect, a computer storage medium is provided, and configured to store a computer software instruction corresponding to the handover method provided in the third aspect. The computer software instruction includes a designed program used to perform the eleventh aspect.

According to a fourteenth aspect, a CN is provided. The CN may include: a receiving module, configured to receive a care-of test initialization message sent by a NAR, where the care-of test initialization message includes an NCoA of an MN; a construction module, configured to construct a care-of keygen token based on the NCoA of the MN; a sending module, configured to send the care-of keygen token to the NAR, so that after the MN is connected to the NAR, the NAR sends the care-of keygen token to the MN; and a binding module, configured to be bound with the MN based on the care-of keygen token sent by the MN. For beneficial effects that can be achieved by the CN provided in the eleventh aspect of the embodiments of the present disclosure, refer to the fourth aspect. Details are not described herein again.

In a first possible implementation of the fourteenth aspect, the binding module is specifically configured to receive a binding update message sent by the MN, where the binding update message includes the care-of keygen token and a home address HoA authentication parameter, the HoA authentication parameter includes a CGA parameter and a CGA signature, or the HoA authentication parameter includes a permanent home keygen token, or the HoA authentication parameter includes a home keygen token; and send a binding acknowledgement message to the MN based on the binding update message.

According to a fifteenth aspect, a CN is provided. The CN may implement a function performed in the handover method example provided in the fourth aspect, and the function may be implemented by using hardware, or may be implemented by hardware by executing corresponding software. The hardware or the software includes one or more modules corresponding to the foregoing function.

In a possible implementation of the fifteenth aspect, a structure of the CN includes a processor, a memory, a bus, and a communications interface. The processor is configured to support the CN in performing a corresponding function in the foregoing method. The communications interface is configured to support communication between the CN and another network element. The CN may further include the memory. The memory is configured to be coupled to the processor, and the memory stores a program instruction and data required by the CN. The communications interface may be specifically a transceiver.

According to a sixteenth aspect, a computer storage medium is provided, and configured to store a computer software instruction corresponding to the handover method provided in the fourth aspect. The computer software instruction includes a designed program used to perform the fourteenth aspect.

Any handover apparatus or computer storage medium provided above is configured to perform the handover method provided above. For beneficial effects that can be achieved by the handover apparatus or the computer storage medium, refer to beneficial effects in a corresponding method provided above. Details are not described herein again.

In addition, a handover system is further provided, including an MN, a PAR, a NAR, and a CN. The MN may be any MN provided in the fifth aspect or the sixth aspect. The PAR may be any access router provided in the eighth aspect or the ninth aspect. The NAR may be any access router provided in the eleventh aspect or the twelfth aspect. The CN may be any CN provided in the fourteenth aspect or the fifteenth aspect. The handover system is used to perform the handover method provided above. For beneficial effects that can be achieved by the handover system, refer to beneficial effects in the handover method and the apparatus provided above. Details are not described herein again.

DESCRIPTION OF EMBODIMENTS

The technical solutions provided in the embodiments of the present disclosure may be applied to a system architecture that includes a home network and one or more foreign networks. Specifically, the technical solutions may be applied to a scenario in which an MN is handed over from one network (referred to as a "previous access network" below) to another network (referred to as a "new access network" below). The previous access network may be a home network, and the new access network may be a foreign network. Alternatively, the previous access network may be a foreign network, and the new access network may be another foreign network. Each network may support one network segment, and each network segment may include one or more IP addresses. Different networks may support different network segments, and there is usually no intersection between network segments supported by different networks.

When a conventional IP technology is used, after the MN moves from the previous access network to the new access network, the MN needs to change an IP address of the MN in the previous access network to an IP address supported by the new access network, so as to implement communication with a CN. In addition, after the MN moves from the previous access network to the new access network, the MN usually cannot continue to use a resource of the previous access network.

When an MIPv6 technology is used and the MN uses a network based on the Transmission Control Protocol/Internet Protocol (TCP/IP) in a cross-network random movement and roaming process, the MN does not change an original IPv6 address (to be specific, the IP address of the MN in the previous access network), and may continue to enjoy all rights in the previous access network. In brief, the MIPv6 technology is to implement all-round network movement or roaming. The MIPv6 technology provides a routing mechanism in a network layer, where the routing mechanism may enable the MN to use a permanent IPv6 address to connect to any link, and route a data packet to those MNs whose locations may rapidly and constantly change.

The MIPv6 technology provides an HoA and a CoA for the MN. When the MN moves from the previous access network to the new access network, the HoA of the MN remains unchanged, and in addition, a temporary IP address (referred to as an NCoA below) in the new access network is obtained.

Figure 1:
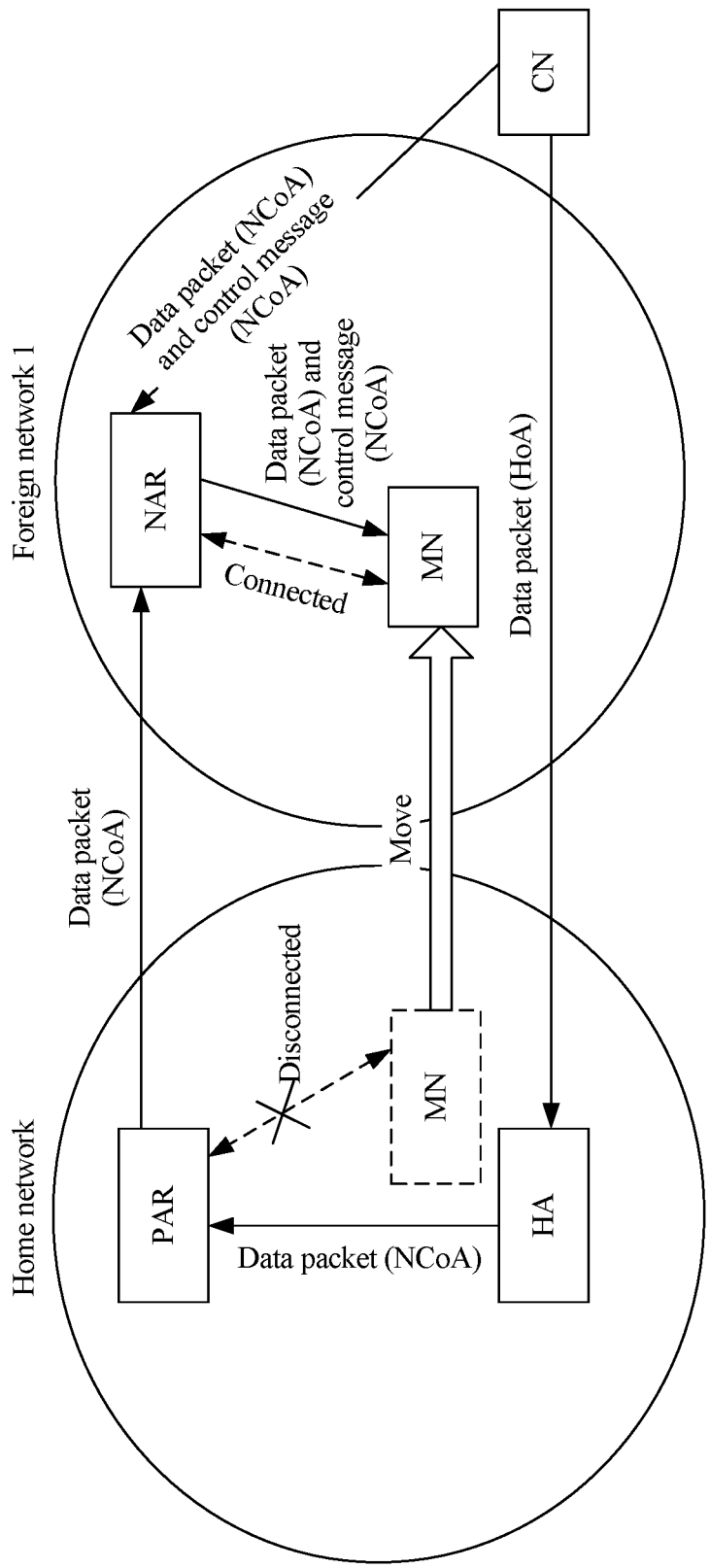
FIG. 1 is a schematic diagram of a system architecture applied to a technical solution according to an embodiment of the present disclosure.

FIG. 1 is a schematic diagram of a system architecture applied to a technical solution according to an embodiment of the present disclosure. An example in which "a previous access network is a home network, and a new access network is a foreign network 1" is used for description in FIG. 1. The system architecture shown in FIG. 1 may include the home network and the foreign network 1. The home network includes a PAR and a home agent (HA), and the foreign network 1 includes a NAR. In addition, the system architecture may further include an MN and a CN. The MN moves from the home network to the foreign network 1. The CN may be in the home network, or may be in the foreign network 1, or may be in any foreign network other than the foreign network 1. An example in which the CN is in a foreign network other than the foreign network 1 is used for description in FIG. 1.

When the MN is in the home network, the MN may communicate with the CN by using an HoA. When the MN is in the foreign network 1, the MN may communicate with the CN by using an NCoA.

When the MN is in the foreign network 1, the HA intercepts a data packet whose destination address is the HoA and that is sent by the CN, changes the data packet whose destination address is the HoA to a data packet whose destination address is the NCoA, and then sends, to the MN by using the PAR and the NAR, the data packet whose destination address is the NCoA.

Figure 2:
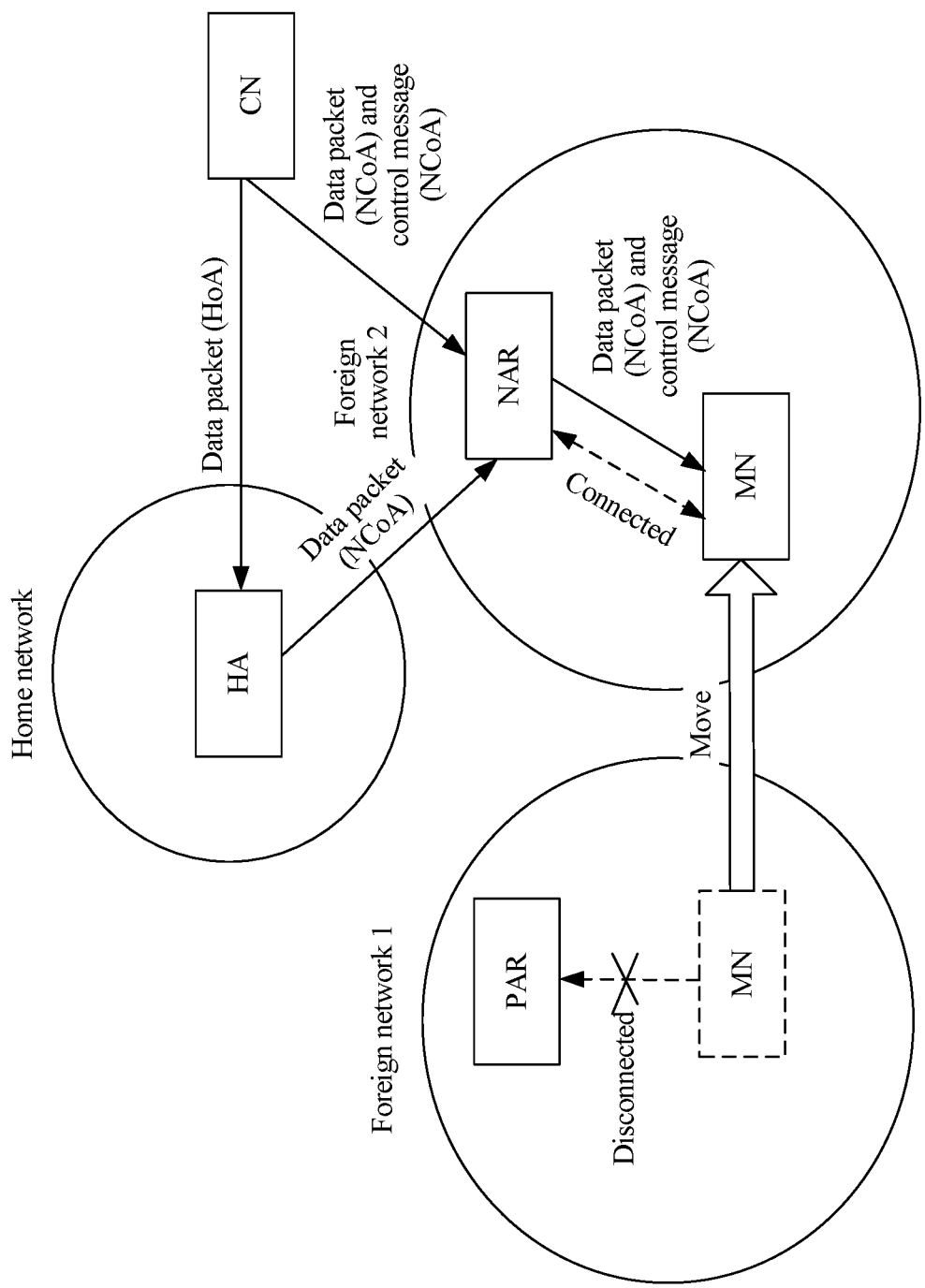
FIG. 2 is a schematic diagram of another system architecture applied to a technical solution according to an embodiment of the present disclosure.

FIG. 2 is a schematic diagram of another system architecture applied to a technical solution according to an embodiment of the present disclosure. An example in which "a previous access network is a foreign network 1, and a new access network is a foreign network 2" is used for description in FIG. 2. The system architecture shown in FIG. 2 may include a home network, the foreign network 1, and the foreign network 2. The home network includes an HA, the foreign network 1 includes a PAR, and the foreign network 2 includes a NAR. In addition, the system architecture may further include an MN and a CN. The MN moves from the foreign network 1 to the foreign network 2. The CN may be in the home network, or may be in the foreign network 1, or may be in the foreign network 2, or may be in any foreign network other than the foreign network 1 and the foreign network 2. An example in which the CN is in a foreign network other than the foreign network 1 and the foreign network 2 is used for description in FIG. 2.

When the MN is in the foreign network 1, the MN may directly communicate with the CN by using a previous CoA PCoA), and the PCoA is a CoA supported by the foreign network 1. When the MN is in the foreign network 2, the MN may communicate with the CN by using an NCoA (namely, a CoA supported by the foreign network 2).

When the MN is in the foreign network 2, the HA intercepts a data packet whose destination address is an HoA and that is sent by the CN, changes the data packet whose destination address is the HoA to a data packet whose destination address is the NCoA, and then sends, to the MN by using the NAR, the data packet whose destination address is the NCoA.

When moving from the previous access network to the new access network, the MN needs to be disconnected from the PAR in the previous access network and establish a connection to the NAR in the new access network. This process is referred to as a "handover process" below. In addition, after establishing the connection to the NAR, the MN further needs to perform a process of configuring the NCoA, a binding update process, and so on. Therefore, the CN can communicate with the MN by using the NCoA. It can be learned that a handover delay includes at least an NCoA configuration delay and a binding update delay.

Figure 3:
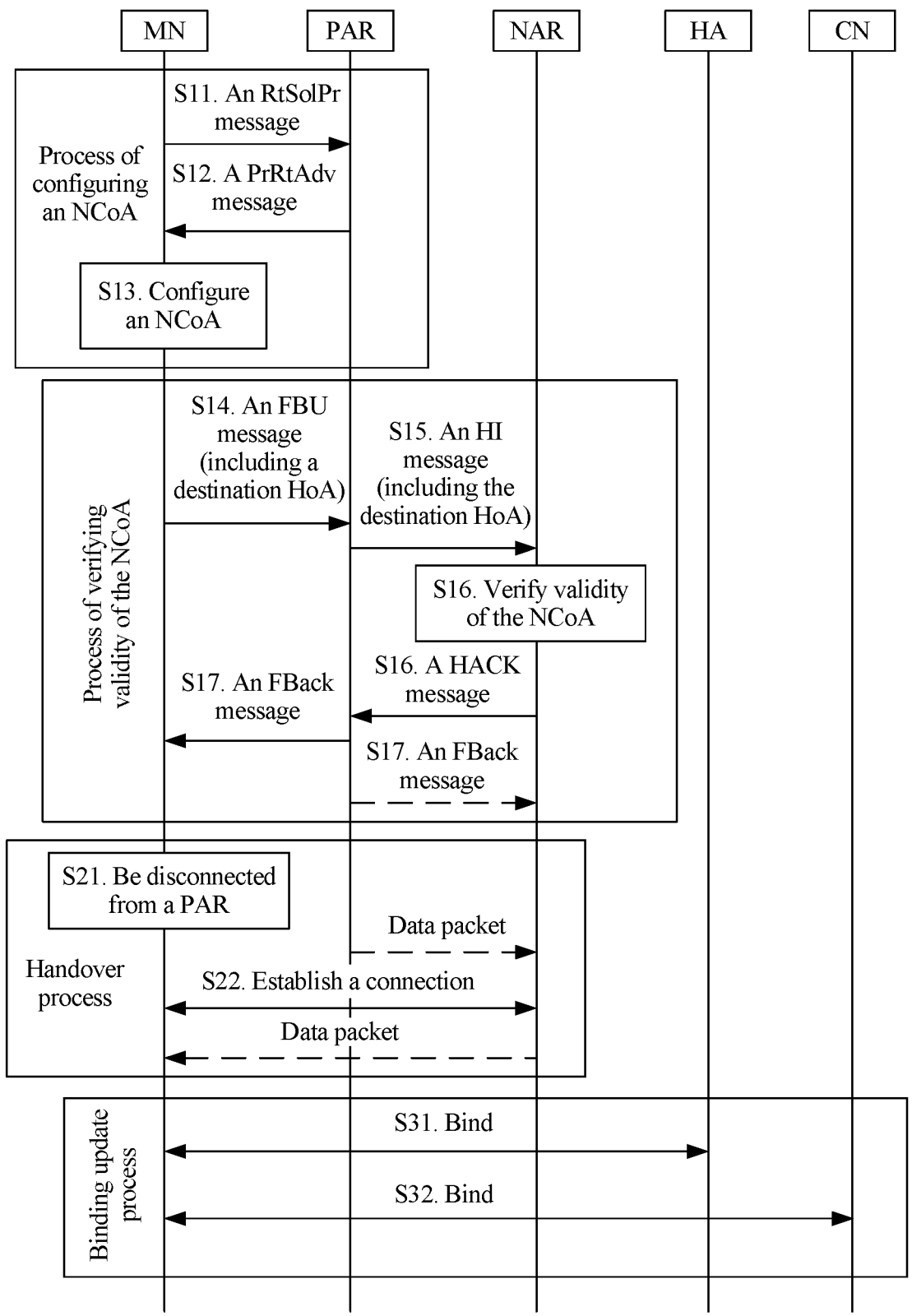
FIG. 3 is a schematic flowchart of a handover method in the prior art.

To reduce the handover delay, the NCoA may be configured before the MN establishes the connection to the NAR. A handover method provided in this case is shown in FIG. 3, and is a schematic flowchart of a handover method provided in the prior art. The method may include a process of configuring an NCoA, a handover process, and a binding update process. Details are as follows:

The process of configuring an NCoA may include the following operations S11 to S13.

Operation S11. An MN sends a router solicitation for proxy advertisement (RtSolPr) message to a PAR, and the PAR receives the RtSolPr message.

The RtSolPr message is used to request the PAR to parse information about one or more access points (AP), including [AP ID, AR-Info] tuple information.

The [AP ID, AR-Info] tuple information specifically includes an address of an AP and a network prefix of a connection port between the AP and an AR (including the PAR and a NAR).

Operation S12. After receiving the RtSolPr message, the PAR sends a proxy router advertisement (PrRtAdv) message to the MN, and the MN receives the PrRtAdv message.

The PrRtAdv message includes one or more pieces of [AP ID, AR-Info] tuple information. One AR may be connected to the one or more APs. When accessing a network in which the AR is located, the MN first needs to connect to an AP connected to the AR.

Operation S13. The MN configures an NCoA based on information carried in the PrRtAdv message.

Further, the method may further include a process of verifying validity of the NCoA. Specifically, the method may include the following operations S14 to S17.

Operation S14. After configuring the NCoA, the MN sends a fast binding update (FBU) message to the PAR, and the PAR receives the FBU message. The FBU message includes the NCoA.

When the previous access network is a home network and the new access network is a foreign network, the FBU message is used to indicate that after the PAR is disconnected from the MN, the PAR may change, to the NCoA, a destination address of a received data packet whose destination address is an HoA, and then send, to the MN by using the NAR, a data packet whose destination address is the NCoA.

When both the previous access network and the new access network are foreign networks, the FBU message is used to indicate that after the PAR is disconnected from the MN, the PAR may change, to the NCoA, a destination address of a received data packet whose destination address is a PCoA, and then send, to the MN by using the NAR, a data packet whose destination address is the NCoA.

Operation S15. The PAR sends a handover initiate (HI) message to a NAR based on the FBU message, and the NAR receives the HI message. The HI message includes the NCoA.

The HI message may be used to instruct the NAR to verify the validity of the NCoA.

Operation S16. The NAR verifies validity of the NCoA and sends a handover acknowledge (HACK) message to the PAR, and the PAR receives the HACK message. The HACK message is used to notify the PAR of a validity result of the NCoA. In addition, the HACK message further includes information about whether the NAR can be connected to the MN.

If the NAR determines that the NCoA is in a network segment supported by a network to which the NAR belongs and the NAR does not locally store the NCoA, it indicates that the NCoA is valid. In other words, the MN can communicate with the CN by using the NCoA. In this case, the HACK message may include information indicating that the NCoA is valid.

If the NAR determines that the NCoA is not in a network segment supported by a network to which the NAR belongs and the NAR locally stores the NCoA, it indicates that the NCoA is invalid. In other words, the MN cannot communicate with the CN by using the NCoA. In this case, the NAR may specify a valid CoA for the MN, and the valid CoA is in the network segment supported by the network to which the NAR belongs. In addition, the NAR may add the valid CoA to the HACK message and send the HACK message to the PAR. Subsequently, the PAR may send the valid CoA to the MN, and the MN may use the valid CoA as the NCoA, so as to communicate with the CN by using the NCoA. It may be understood that in this case, the HACK message may further include information indicating that the NCoA verified in S16 is invalid.

Operation S17. The PAR sends a fast binding acknowledgement (FBack) message to the MN based on the HACK message, and the MN receives the FBack message. The FBack message includes the validity result of the NCoA.

In a specific implementation, the method may further include: sending, to the NAR by the PAR based on the HACK message, the FBack message carrying the validity result of the NCoA, and receiving, by the NAR, the FBack message. After receiving the FBack message, the NAR may receive the data packet whose destination address is the NCoA and that is sent by the PAR.

The handover process may include the following operations S21 and S22.

Operation S21. After receiving the FBack, an MN is disconnected from a PAR.

It may be understood that after S15 to S17 are performed, a tunnel between the PAR and the NAR has been established. In this way, after S21 is performed, the method may further include: sending, by the PAR to the NAR by using the tunnel between the PAR and the NAR, the received data packet sent to the MN.

The data packet that is sent to the MN and that is received by the PAR is from the CN. Specifically, when the previous access network is the home network, the CN sends a data packet to the PAR (to be specific, an AR in the home network), and a destination address of the data packet is the HoA of the MN. When the previous access network is the foreign network, the CN sends a data packet to the PAR (to be specific, an AR in the foreign network), and a destination address of the data packet is the PCoA of the MN.

Operation S22. The MN establishes a connection to a NAR.

After the MN is connected to an AP in the new access network, the MN may send an unsolicited neighbor advertisement (UNA) message to the NAR, to notify that the MN is connected to the AP in the new access network, so that after the NAR is connected to the MN, the NAR may send, to the MN, the received data packet sent by the PAR.

It may be understood that, operations S21 and S22 may be understood as follows: The MN is handed over from the PAR to the NAR.

The binding update process may include the following operations S31 and S32.

Operation S31. An MN is bound with an HA. To be specific, the MN notifies the HA of a mapping relationship between the HoA and the NCoA.

Operation S31 may be implemented by using the following operations S31.1 and S31.2.

Operation S31.1. The MN sends a binding update (BU) message to the HA, and the HA receives the BU message sent by the MN. The BU message includes the NCoA.

Operation S31.2. The HA returns a binding acknowledgement (binding ack) message to the MN, and the MN receives the binding acknowledgement message returned by the HA.

It may be understood that for the CN, the CN may continue to use the HoA of the MN, and send, to the home network in which the MN is located, the data packet sent to the MN. The HA in the home network intercepts the data packet, and then forwards the data packet to the MN in a tunnel manner based on the obtained mapping relationship between the NCoA and the HoA in S31. When the HA forwards the data packet to the MN, the destination address may be the NCoA. This process is referred to as a process 1 below.

It may be understood that, if the previous access network is a home network and the new access network is a foreign network, that the MN is bound with the HA may be understood as follows: A binding relationship is established between the MN and the HA. If the previous access network is a foreign network and the new access network is another foreign network, that the MN is bound with the HA may be understood as follows: A binding relationship between the MN and the HA is updated. Specifically, the MN notifies the HA of the mapping relationship between the HoA and the NCoA.

S32. The MN is bound with a CN. The MN notifies the CN of the mapping relationship between the HoA and the NCoA.

It may be understood that, if the previous access network is a home network and the new access network is a foreign network, that the MN is bound with the CN may be understood as follows: A binding relationship between the MN and the CN is established. If the previous access network is a foreign network and the new access network is another foreign network, that the MN is bound with the CN may be understood as follows: The MN notifies the CN of the mapping relationship between the HoA and the NCoA.

Operation S32 may be implemented by using the following operations S32.1 and S32.2.

Operation S32.1. The MN sends a BU message to the CN, and the CN receives the BU message sent by the MN. The BU message includes the NCoA.

Operation S32.2. The CN returns a binding acknowledgement message to the MN, and the MN receives the binding acknowledgement message returned by the CN. The binding acknowledgement message includes binding acknowledgement information.

For the CN, after learning of the mapping relationship between the HoA and the NCoA, the CN may send, by using the NCoA, the data packet to a foreign network in which the NCoA is located. This process may be referred to as a process 2 below.

The foregoing process 1 may be referred to as a triangular routing process. The foregoing process 2 may be referred to as a communication process after routing optimization.

Figure 4:
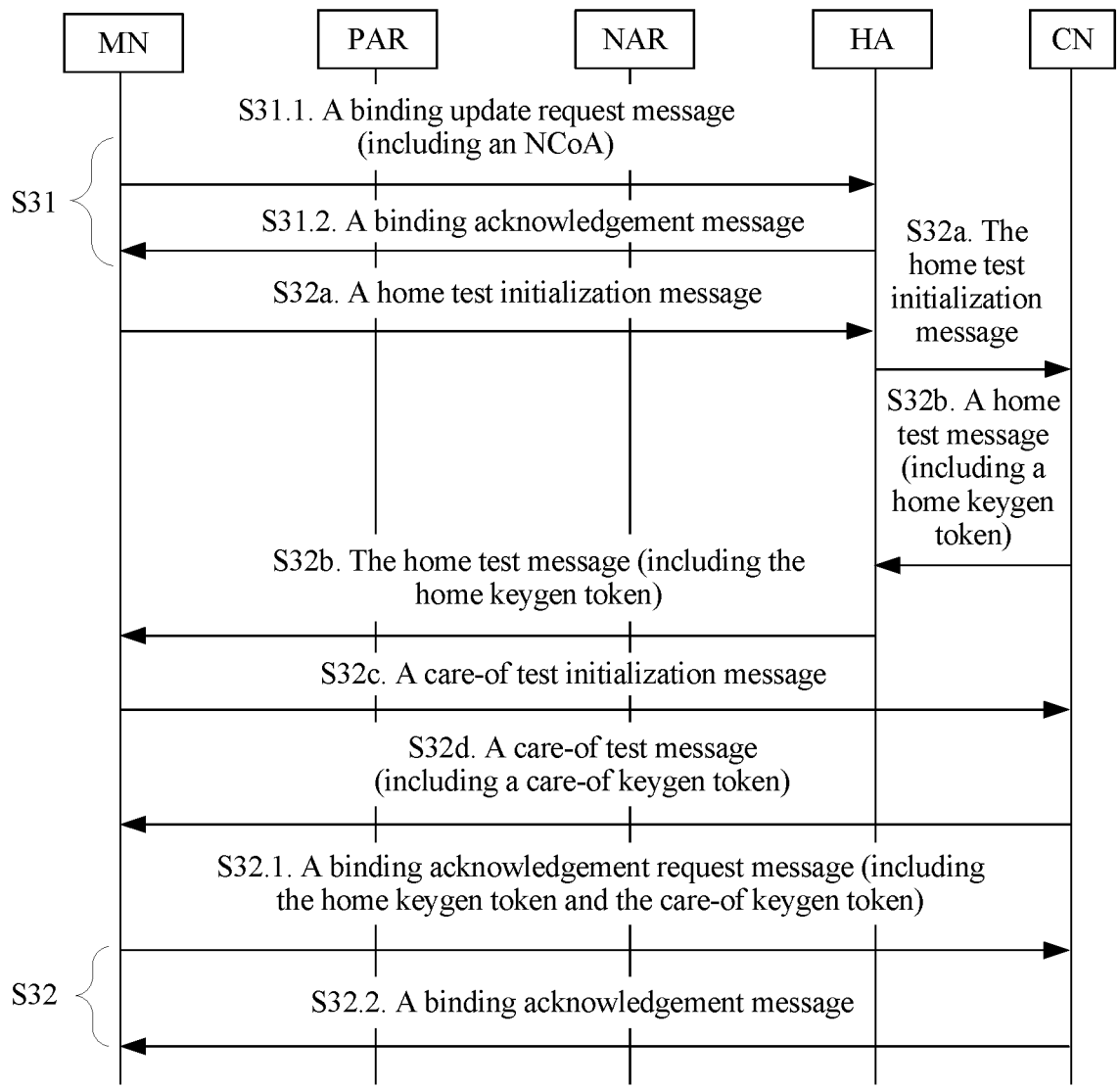
FIG. 4 is a schematic flowchart of binding an MN with a CN in the prior art.

In one embodiment, in an MIPv6 technology, a return routability procedure (RRP) is used to strengthen protection for binding update between the MN and the CN. The RRP may include a home RRP and a care-of RRP. The home RRP is used to determine whether the CN can use the HoA to communicate with the MN through the HA and generate a home initialization cookie (home init cookie) which the MN and the CN both agree on. To be specific, when the CN determines that the HoA may be used to communicate with the MN, the CN returns the home initialization cookie to the MN and generates a home keygen token. The care-of RRP is used to determine whether the CN may use the NCoA to directly communicate with the MN and generate a care-of initialization cookie (care-of init cookie) which the MN and the CN both agree on. To be specific, when the CN determines that the NCoA may be used to communicate with the MN, the CN returns the care-of initialization cookie to the MN and generates a care-of keygen token. Based on this, FIG. 4 is a schematic flowchart of binding an MN with a CN in the prior art. Before S32, the method may further include the following operations S32a to S32d.

Operation S32a. The MN constructs a home test initialization (home test init) message and sends the home test initialization message to the CN by using the HA, and the CN receives, by using the HA, the home test initialization message sent by the MN.

A source address of the home test initialization message is the HoA of the MN, and a destination address is a CN address. The home test initialization message includes the home initialization cookie and the HoA of the MN. The CN generates the home keygen token based on the HoA of the MN.

Operation S32b. The CN constructs a home test message and returns the home test message to the MN by using the HA, and the MN receives, by using the HA, the home test message returned by the CN.

The home test message is a response of the CN to the home test initialization message. A source address of the home test message is the CN address, and a destination address is the HoA of the MN. The home test message includes the home initialization cookie and the home keygen token.

Specifically, after receiving the home test initialization message, the CN may determine that the CN may use the HoA to communicate with the MN through the HA, generate the home keygen token based on the HoA of the MN, and then return, to the MN, the home test message that carries the home initialization cookie and the home keygen token.

Operation S32c. The MN constructs a care-of test initialization (care-of test init) message and sends the care-of test initialization message to the CN, and the CN receives the care-of test initialization message sent by the MN.

A source address of the care-of test initialization message is the NCoA of the MN, and a destination address is the CN address. The care-of test initialization message includes the care-of initialization cookie and the NCoA of the MN. The CN generates the care-of keygen token based on the NCoA of the MN.

Operation S32d. The CN constructs a care-of test message and returns the care-of test message to the MN, and the MN receives the care-of test message returned by the CN.

The care-of test message is a response of the CN to the care-of test initialization message. A source address of the care-of test message is the CN address, and a destination address is the NCoA of the MN. The care-of test message includes the care-of initialization cookie and the care-of keygen token.

Specifically, after receiving the care-of test initialization message, the CN may determine that the CN may use the NCoA to communicate with the MN, generate the care-of keygen token based on the NCoA of the MN, and then return, to the MN, the care-of test message that carries the care-of initialization cookie and the care-of keygen token.

It should be noted that, when S32 is performed after S32a to S32d are performed, S32 may specifically include: calculating, by the MN, a message authentication code based on the home keygen token and the care-of keygen token, and sending a secure binding update message to the CN.

It can be learned from FIG. 4 that a binding update delay may include at least the following delays:

a home test initialization message delay, to be specific, a delay generated by performing S32a;

a home test message delay, to be specific, a delay generated by performing S32b;

a care-of test initialization message delay, to be specific, a delay generated by performing S32c;

a care-of test message delay, to be specific, a delay generated by performing S32d;

a delay of the binding update message sent to the HA, to be specific, a delay generated by performing S31.1;

a delay of the binding acknowledgement message sent by the HA, to be specific, a delay generated by performing S31.2;

a delay of the binding update message sent to the CN, to be specific, a delay generated by performing S32.1; and a delay of the binding acknowledgement message sent by the CN, to be specific, a delay generated by performing S32.2.

It can be learned from the foregoing description that, in the technical solution shown in FIG. 3, a handover delay can be reduced by only reducing a delay of configuring an NCoA, and the binding update delay cannot be reduced. Based on this, the embodiments of the present disclosure provide a handover method, and the handover delay may be reduced by reducing the binding update delay. Specifically, the binding update delay may be reduced by reducing the care-of test initialization message delay. In one embodiment, a delay of constructing the care-of test message may further be reduced. The binding update delay may also be reduced by reducing the home test initialization message delay and the home test message delay.

Figure 5A:
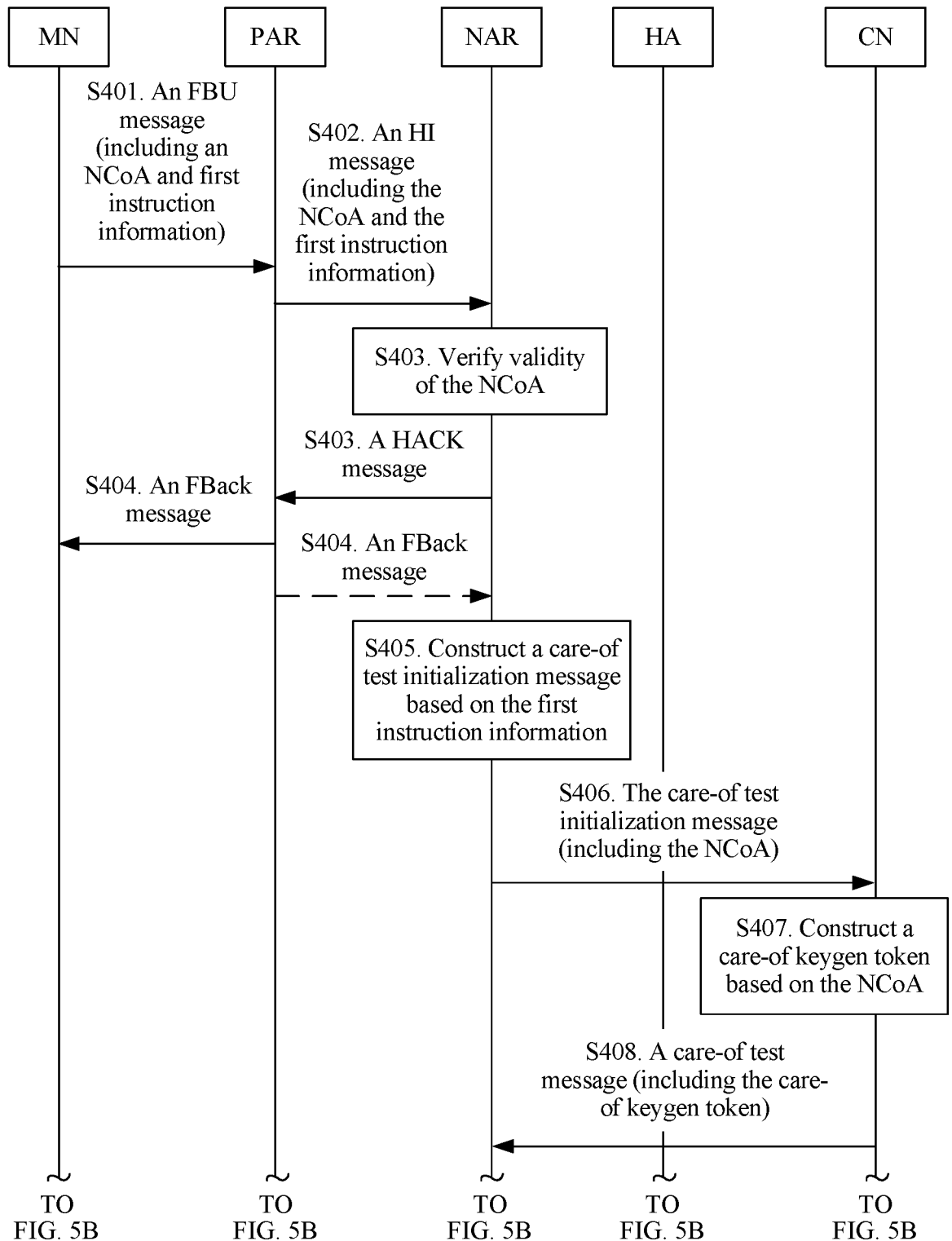
FIG. 5A and FIG. 5B are a schematic flowchart of a handover method according to an embodiment of the present disclosure.
Figure 5B:
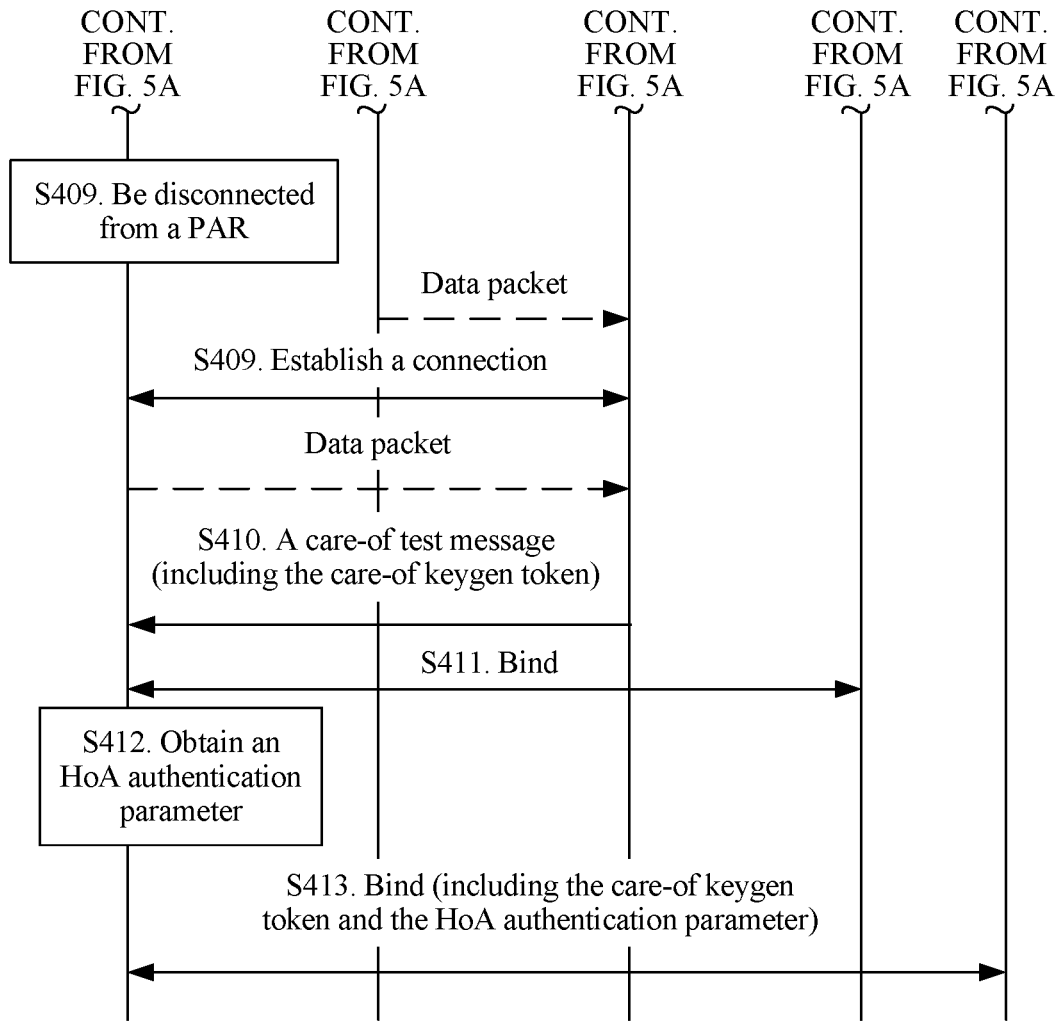

The following describes the embodiments of the present disclosure with reference to the accompanying drawings. FIG. 5A and FIG. 5B are a schematic flowchart of a handover method according to an embodiment of the present disclosure. The method may include the following operations: S401 to S413.

Operation S401. An MN sends an FBU message to a PAR, and the PAR receives the FBU message. The FBU message includes first instruction information. The FBU message is used to instruct the PAR to send an HI message to a NAR. The HI message includes the first instruction information. The first instruction information is used to instruct the NAR to construct a care-of test initialization message and send the care-of test initialization message to a CN. The care-of test initialization message includes an NCoA, and is used to instruct the CN to construct a care-of keygen token based on the NCoA.

Before being handed over from the PAR to the NAR, and after configuring the NCoA, the MN may perform S401. For a specific implementation of configuring the NCoA by the MN, refer to S11 to S13.

It may be understood that, different from the FBU message in the technical solution shown in FIG. 3, the FBU message in the technical solution shown in FIG. 5A and FIG. 5B further includes the first instruction information. Different from the HI message in the technical solution shown in FIG. 3, the HI message in the technical solution shown in FIG. 5A and FIG. 5B further includes the first instruction information. This embodiment of the present disclosure further provides a format of the FBU message and a format of the HI message that are applicable to the technical solution shown in FIG. 5A and FIG. 5B. For details, refer to the following.

The first instruction information may include required information that is used to instruct the NAR to construct the care-of test initialization message, for example, a CN address and a care-of initialization cookie. An example in which the first instruction information includes the CN address and the care-of initialization cookie is used for description in the following.

A function of the care-of test initialization message in the technical solution shown in FIG. 5A and FIG. 5B may be the same as a function of the care-of test initialization message in the technical solution shown in FIG. 3, and the two care-of test initialization messages are both used to enable the CN to verify whether the NCoA can be used to communicate with the MN. It may be understood that there are at least the following differences when the care-of test initialization message in the technical solution shown in FIG. 3 is compared with the care-of test initialization message in the technical solution shown in FIG. 5A and FIG. 5B.

A first difference is that the care-of test initialization message in the technical solution shown in FIG. 3 is constructed and transmitted to the CN after the MN is handed over from the PAR to the NAR, while the care-of test initialization message in the technical solution shown in FIG. 5A and FIG. 5B is constructed and transmitted to the CN before the MN is handed over from the PAR to the NAR. That the MN is handed over from the PAR to the NAR may be understood as follows: The MN switches from a connection to the PAR to a connection to the NAR.

Based on this, the care-of test initialization message in the technical solution shown in FIG. 5A and FIG. 5B may also be marked as pre-care-of test init.

A second difference is that the care-of test initialization message in the technical solution shown in FIG. 3 is constructed by the MN and is transmitted by the MN to the CN, while the care-of test initialization message in the technical solution shown in FIG. 5A and FIG. 5B is constructed by the NAR, and is transmitted by the NAR to the CN. This embodiment of the present disclosure further provides a format that is of the care-of test initialization message and that is applicable to the technical solution shown in FIG. 5A and FIG. 5B. For details, refer to the following.

Operation S402. The PAR sends an HI message to a NAR based on the FBU message, and the NAR receives the HI message. The HI message includes the first instruction information. The HI message is used to instruct the NAR to verify validity of the NCoA.

Operation S403. After receiving the HI message, the NAR verifies validity of an NCoA and sends an HACK message to the PAR, and the PAR receives the HACK message. The HACK message is used to notify the PAR of a validity result of the NCoA.

Operation S404. The NAR sends an FBack message to the MN based on the HACK message, and the MN receives the FBack message. The FBack message includes the validity result of the NCoA.

In a specific implementation, the method may further include: sending, by the PAR, an FBack message to the NAR, and receiving, by the NAR, the FBack message.

For a specific implementation process of S403 and S404, refer to operations S16 and S17 above.

It may be understood that in S401 to S404, the first instruction information is carried in the FBU message and the HI message in a process of verifying the validity of the NCoA, and is sent by the MN to the NAR by using the PAR. In this way, signaling overheads can be reduced. In a specific implementation, the first instruction information may alternatively be carried in a new message and the new message is sent by the MN to the PAR; and then, the first instruction information is carried in another new message and the another new message is sent by the PAR to the NAR. The first instruction information may further be carried in the FBU message and the FBU message is sent by the MN to the PAR; and then, the first instruction information is carried in a new message and the new message is sent by the PAR to the NAR. In addition, the process of verifying the validity of the NCoA and the process of S401 may alternatively be performed separately. For example, the first instruction information may further be carried in a new message and the new message is sent by the MN to the PAR; and then, the first instruction information is carried in the HI message and the HI message is sent by the PAR to the NAR. A specific implementation of any of the foregoing new messages is not limited in this embodiment of the present disclosure.

Operation S405. The NAR constructs a care-of test initialization message based on first instruction information. The care-of test initialization message includes the care-of initialization cookie.

The NAR may construct the care-of test initialization message based on information such as the CN address and the care-of initialization cookie. For a specific implementation process, refer to a process in which the MN constructs the care-of test initialization message. A source address of the care-of test initialization message is a NAR address, and a destination address is the CN address.

It may be understood that if it is determined in S403 that the NCoA is valid, the NCoA included in the care-of test initialization message may be the NCoA included in the HI message. If it is determined in S403 that the NCoA is invalid, the NCoA included in the care-of test initialization message may be a valid NCoA specified by the NAR for the MN. For related explanation of the valid NCoA, refer to operation S16 above.

An execution sequence of S404 and S405 is not limited in this embodiment of the present disclosure. For example, S404 may be performed before S405, or S405 may be performed before S404, or S404 and S405 may be simultaneously performed.

Operation S406. The NAR sends the care-of test initialization message to a CN, and the CN receives the care-of test initialization message.

In this case, the CN receives the care-of test initialization message. To be specific, in the technical solution provided in this embodiment of the present disclosure, before the MN is handed over from the PAR to the NAR, the CN receives the care-of test initialization message. In this way, a binding update delay may not include a care-of test initialization message delay (to be specific, a delay generated by performing S32c), thereby reducing the binding update delay.

Operation S407. The CN constructs a care-of keygen token based on the NCoA in the care-of test initialization message.

The care-of keygen token constructed by the CN in this operation may be the care-of keygen token in the technical solution shown in FIG. 3.

Operation S408. The CN sends a care-of test message to the NAR, and the NAR receives the care-of test message sent by the CN. The care-of test message may include the care-of initialization cookie and the care-of keygen token.

A source address of the care-of test message is the CN address, and a destination address is the NAR address.

It may be understood that in S408, the care-of initialization cookie and the care-of keygen token may alternatively be carried in a new message and the new message is sent by the CN to the NAR. A specific implementation of the foregoing new message is not limited in this embodiment of the present disclosure.

A function of the care-of test message in the technical solution shown in FIG. 5A and FIG. 5B is the same as a function of the care-of test message in the technical solution shown in FIG. 3, and the two care-of test messages are both used to respond to the care-of test initialization message. In one embodiment, for the care-of test message in the technical solution shown in FIG. 5A and FIG. 5B, the NCoA may be set in a loose source routing option of the care-of test message in the technical solution shown in FIG. 3, so that the NAR sends the care-of test message to the MN.

After receiving the care-of test message sent by the CN, if it is detected that the MN is handed over to the NAR, the NAR sends the care-of test message to the MN; or if it is not detected that the MN is handed over to the NAR, the NAR caches the care-of test message. In one embodiment, when it is not detected that the MN is handed over to the NAR in a preset time period starting from a moment of caching the care-of test message, the NAR may discard the care-of test message, thereby reducing a storage resource. An implementation of the preset time period is not limited in this embodiment of the present disclosure.

Operation S409. The MN is disconnected from the PAR, and establishes a connection to the NAR.

After moving from a previous access network to a new access network, the MN may perform S409. For a specific implementation of S409, refer to S21 and S22. In addition, for a data packet transmission process after the MN is disconnected from the PAR and establishes the connection to the NAR, refer to the foregoing.

Operation S410. After detecting the connection to the MN, the NAR sends a care-of test message to the MN.

It may be understood that after S408 is performed, the NAR may receive the care-of test message, and may cache the care-of test message. Therefore, after detecting the connection to the MN, the NAR may immediately send the care-of test message to the MN. In this way, a delay of constructing the care-of test message may be further reduced.

Operation S411. The MN is bound with an HA. This operation is the same as S31 above.

Operation S412. The MN obtains an HoA authentication parameter. Specifically, this operation may be implemented in any following manner.

Manner 1: If the MN locally stores a permanent home keygen token, the MN may use the permanent home keygen token as the HoA authentication parameter. The permanent home keygen token locally stored by the MN may be obtained by periodically updating by the MN and the CN. To be specific, the MN and the CN periodically send messages to each other, to obtain the permanent home keygen token. In this way, the MN may subsequently construct a BU message by using the permanent home keygen token, thereby reducing overheads. In addition, in this manner, the binding update delay may not include a home test initialization message delay and a home test message delay, thereby reducing the binding update delay. In one embodiment, the MN may obtain the permanent home keygen token from a locally stored binding update list. The binding update list records information about the binding between the MN and the CN, and may specifically include the permanent home keygen token, an IP address of the CN, an HoA address of the MN, a CoA address of the MN, a life time initial value of the binding update message, a remaining life time value of the binding update message, a maximum value of a sequence number, and the like.

Manner 2: If the MN does not locally store the permanent home keygen token, but stores a Cryptographically Generated Address (CGA) parameter and a CGA signature, the MN may use the CGA parameter and the CGA signature as the HoA authentication parameter. In this way, the binding update delay may not include a home test initialization message delay and a home test message delay, thereby reducing the binding update delay.

It should be noted that the MN does not locally store the permanent home keygen token and the HoA is not a CGA address. This indicates that the MN accesses a network (including a home network and a foreign network) for the first time, in other words, the MN does not communicate with the CN before. In this case, in one embodiment, the MN may request the home keygen token from the CN by using a home RRP, and then the MN may request the permanent home keygen token from the CN through initial CGA-based authentication.

Manner 3: The MN obtains the home keygen token (namely, the home keygen token in S32 above) from the CN through the HA. For a specific implementation process, refer to S32a and S32b. Then, the MN uses the home keygen token as the HoA authentication parameter. It should be noted that, because the home keygen token has a validity period, the home keygen token becomes invalid after the validity period expires. Therefore, to ensure that the obtained home keygen token is within the validity period, in one embodiment, the MN may obtain the HoA authentication parameter after receiving the FBack message. Alternatively, in one embodiment, the MN periodically obtains the home keygen token, and when the MN needs to construct a binding request message, the MN constructs the binding request message based on the obtained latest home keygen token. Certainly, a specific implementation is not limited thereto.

It may be understood that in a manner 1 and a manner 2, the MN locally obtains the HoA authentication parameter, and the obtained HoA authentication parameter does not have the validity period, in other words, the obtained HoA authentication parameter can be constantly used. Therefore, alternatively, the MN may perform S412 before establishing the connection to the NAR, so that the MN directly uses the obtained HoA authentication parameter when performing S413.

An execution sequence of S411 and S412 is not limited in this embodiment of the present disclosure.

Operation S413. The MN is bound with the CN based on the HoA authentication parameter and the care-of keygen token. This operation is the same as S32 above.

It should be noted that in a specific implementation of operation S413, the MN calculates a message authentication code based on the HoA authentication parameter and the care-of keygen token, and then the MN may send, to the CN, a new message that carries the message authentication code. The CN may send, to the MN, a new message that carries binding acknowledgement information. A specific implementation of any of the foregoing new messages is not limited in this embodiment of the present disclosure.

In the handover method provided in this embodiment of the present disclosure, the MN may transmit the care-of test initialization message to the CN by using the NAR before establishing the connection to the NAR in the new access network. In this way, after the MN establishes the connection to the NAR, the NAR may send the care-of test message to the MN. Compared with the prior art, in this embodiment of the present disclosure, the binding update delay may be reduced by reducing the care-of test initialization message delay, thereby reducing a handover delay. Further, in the handover method provided in this embodiment of the present disclosure, the home test initialization message delay, the home test message delay, and the like may be further reduced. For details, refer to the foregoing.

Figure 6:
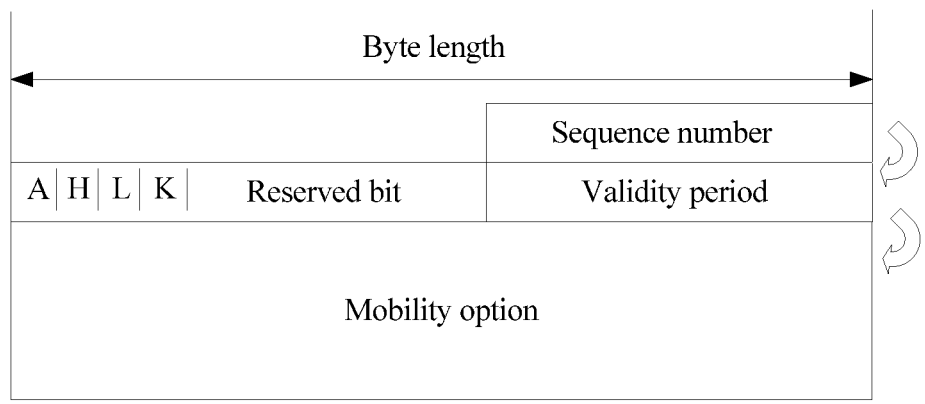
FIG. 6 is a schematic diagram of constructing an FBU message by an MN according to an embodiment of the present disclosure.

In the technical solution shown in FIG. 5A and FIG. 5B, the FBU message in operation S401 carries the first instruction information. Based on this, FIG. 6 is a schematic diagram of constructing an FBU message by an MN according to the technical solution shown in FIG. 5A and FIG. 5B. An example in which the FBU message carries first instruction information and the first instruction information includes a CN address and a care-of initialization cookie is used for description in FIG. 6. Specifically, the MN first encapsulates a sequence number of the FBU message, then encapsulates an identifier of the FBU message, and finally encapsulates a mobility option. The mobility option of the FBU message includes the first instruction information. The identifier of the FBU message may include an acknowledgement (marked as "A" below) identifier, a home agent registration (marked as "H" below) identifier, a local link address compatibility (marked as "L" below) identifier, a key management mobility capability (marked as "K" below) identifier, a reserved bit, and a validity period, and the like.

The mobility option of the FBU message may include a mobility option 1 and a mobility option 2, the mobility option 1 includes the CN address, and the mobility option 2 includes the care-of initialization cookie. In this embodiment of the present disclosure, the mobility option 1 may be referred to as a CN address option, and the mobility option 2 may be referred to as a care-of initialization cookie option (care-of init cookie option). The MN may self-define the mobility option (including the mobility option 1 and the mobility option 2) in a type-length-value (TLV) format.

Figure 7:
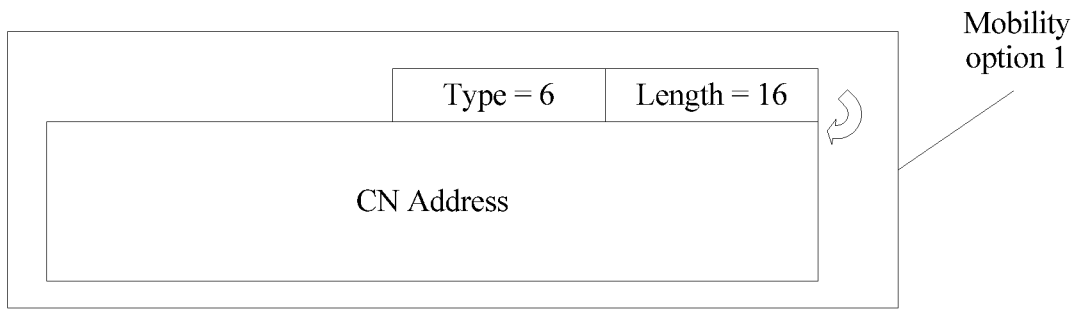
FIG. 7 is a schematic diagram of constructing a mobility option according to an embodiment of the present disclosure.

FIG. 7 is a schematic diagram of constructing a mobility option 1. Specifically, a type and a length of the mobility option 1 are first set, and then, option data of the mobility option 1 is set as the CN address. An example in which the type of the mobility option 1 is set to 6, and the length is set to 16 is used for description in FIG. 7.

Figure 8:
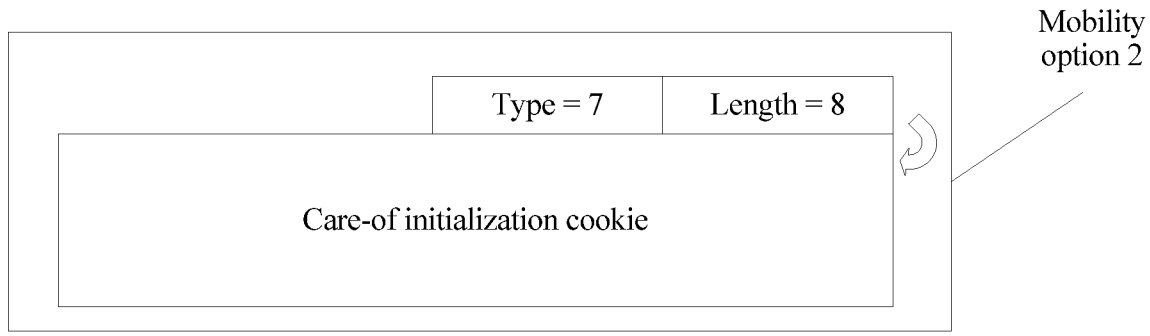
FIG. 8 is a schematic diagram of constructing another mobility option according to an embodiment of the present disclosure.

FIG. 8 is a schematic diagram of constructing a mobility option 2. Specifically, a type and a length of the mobility option 2 are first set, and then, option data of the mobility option 2 is set as the care-of initialization cookie. An example in which the type of the mobility option 2 is set to 7, and the length is set to 8 is used for description in FIG. 8.

Figure 9:
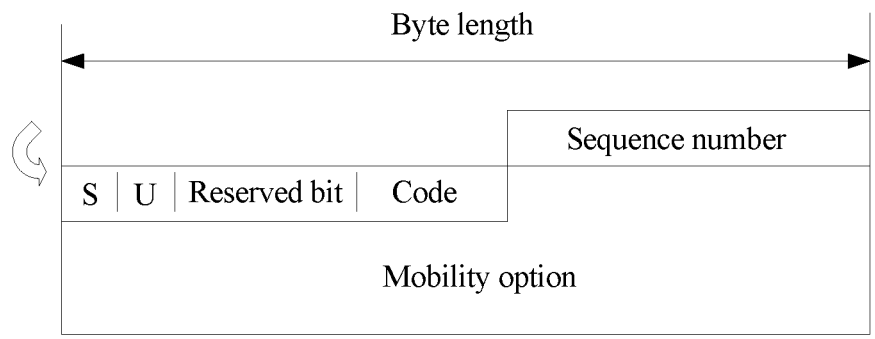
FIG. 9 is a schematic diagram of constructing an HI message by a PAR according to an embodiment of the present disclosure.

In the technical solution shown in FIG. 5A and FIG. 5B, the HI message in operation S402 carries the first instruction information. Based on this, FIG. 9 is a schematic diagram of constructing an HI message by a PAR according to the technical solution shown in FIG. 5A and FIG. 5B. An example in which the HI message carries first instruction information and the first instruction information includes a CN address and a care-of initialization cookie is used for description in FIG. 9. Specifically, the PAR first encapsulates a sequence number, then encapsulates an identifier of the HI message, and finally encapsulates a mobility option. The mobility option of the FBU message includes the first instruction information. The identifier of the HI message may include an allocation address configuration (marked as "S" below) identifier, a cache identifier (marked as "U" below) identifier, a reserved bit, a code, and the like.

The mobility option of the HI message may include a mobility option 3 and a mobility option 4, the mobility option 3 includes the CN address, and the mobility option 4 includes the care-of initialization cookie. In this embodiment of the present disclosure, for a method for constructing the mobility option 3, refer to FIG. 7. For a method for constructing the mobility option 4, refer to FIG. 8.

Figure 10:
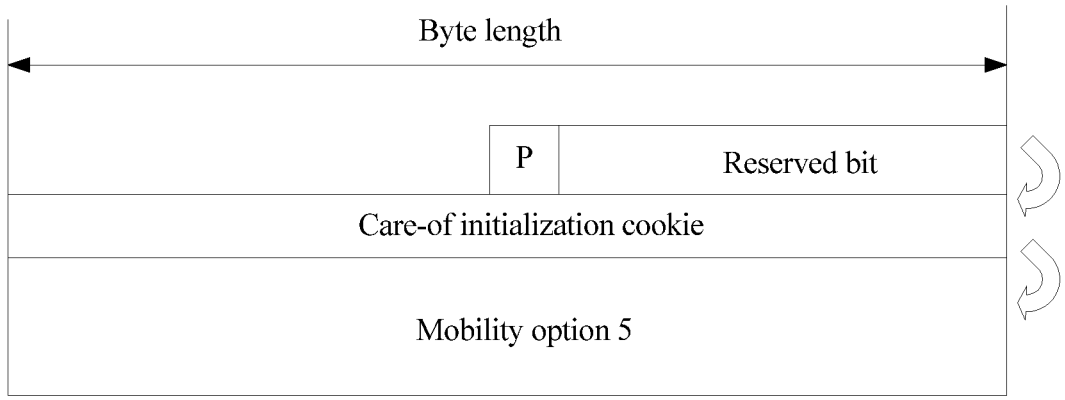
FIG. 10 is a schematic diagram of constructing a care-of test initialization message by a NAR according to an embodiment of the present disclosure.

In the technical solution shown in FIG. 5A and FIG. 5B, the NAR constructs the care-of test initialization message based on the first instruction information. The care-of test initialization message constructed by the NAR includes the care-of initialization cookie, the NCoA, and an additional flag bit (such as "P"). The flag bit is used to represent that the care-of test initialization message is constructed by the NAR. Based on this, FIG. 10 is a schematic diagram of constructing a care-of test initialization message by a NAR. The care-of test initialization message in FIG. 10 includes an NCoA and a care-of initialization cookie. Specifically, the NAR first encapsulates a flag bit and a reserved bit, then encapsulates the care-of initialization cookie, and finally encapsulates a mobility option.

The mobility option of the care-of test initialization message includes a mobility option 5, and the mobility option 5 includes the NCoA. In this embodiment of the present disclosure, the mobility option 5 may be referred to as a reachable care-of address option.

Figure 11:
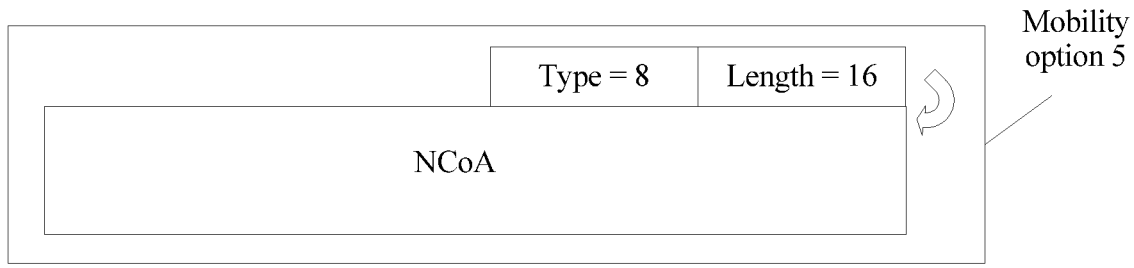
FIG. 11 is a schematic diagram of constructing another mobility option according to an embodiment of the present disclosure.

FIG. 11 is a schematic diagram of constructing a mobility option 5. Specifically, a type and a length of the mobility option 5 are first set, and then, option data of the mobility option 5 is set as an NCoA. An example in which the type of the mobility option 5 is set to 8, and the length is set to 16 is used for description in FIG. 11.

The foregoing mainly describes the solutions provided in the embodiments of the present disclosure from a perspective of the MN, the PAR, the NAR, and the CN. It may be understood that, to achieve the foregoing functions, the MN, the PAR, the NAR, and the CN include a corresponding hardware structure and/or software module for performing each function. A person skilled in the art may be readily aware that, in combination with the example modules and algorithm operations described in the embodiments disclosed in this specification, the embodiments of the present disclosure can be implemented in a form of hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

In the embodiments of the present disclosure, the MN, the PAR, the NAR, and the CN may be divided into function modules based on the foregoing method examples. For example, each function module may be obtained through division based on a corresponding function, or two or more functions may be integrated into one processing module. The integrated module may be implemented in a form of hardware, or may be implemented in a form of a functional module of software. It should be noted that the module division in the embodiments of the present disclosure is an example, and is merely logical function division. There may be another division manner in an actual implementation.

Figure 12:
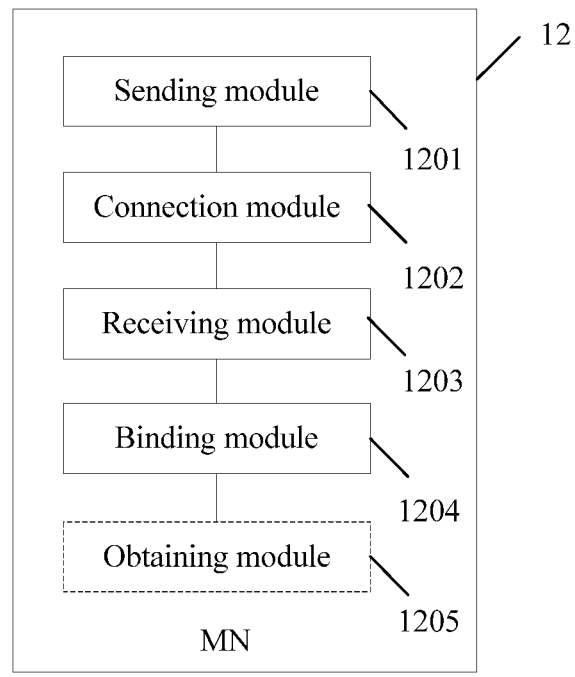
FIG. 12 is a schematic structural diagram of an MN according to an embodiment of the present disclosure.

FIG. 12 is a schematic structural diagram of an MN 12 according to an embodiment of the present disclosure. The MN 12 shown in FIG. 12 may be the MN provided above. The MN 12 may include a sending module 1201, a connection module 1202, a receiving module 1203, and a binding module 1204. In addition, the MN 12 may further include an obtaining module 1205.

The sending module 1201 is configured to support the MN 12 in performing S11 and S14 in FIG. 3, S32a and S32c in FIG. 4, S401 in FIG. 5A and FIG. 5B, and/or another process used for the technology described in this specification. The connection module 1202 is configured to support the MN 12 in performing S21 and S22 in FIG. 3, S409 in FIG. 5A and FIG. 5B, and/or another process used for the technology described in this specification. The receiving module 1203 is configured to support the MN 12 in performing S17 in FIG. 3, S32b and S32d in FIG. 4, and/or another process used for the technology described in this specification. The binding module 1204 is configured to support the MN 12 in performing S31 and S32 in FIG. 3, and S31.1, S31.2, S32.1, and S32.2 in FIG. 4, and/or another process used for the technology described in this specification. The obtaining module 1205 is configured to perform S412 in FIG. 5A and FIG. 5B. In addition, the MN 12 may further include a storage module. The storage module is configured to store program code and data corresponding to any handover method provided above and performed by the MN 12.

For hardware implementation, the sending module 1201 may be a transmitter, the receiving module 1203 may be a receiver, and the receiver and the transmitter may be integrated together to form a transceiver. The connection module 1202, the binding module 1204, and the obtaining module 1205 may be built in or independent of a memory of the MN 12 in a hardware form, so that a processor invokes and performs an operation corresponding to each of the foregoing units.

Figure 13:
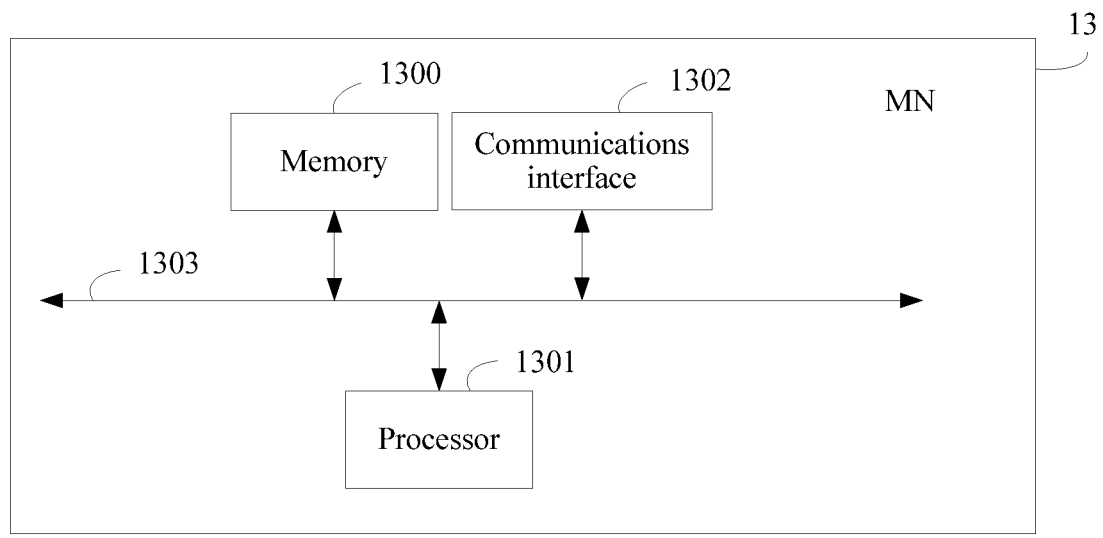
FIG. 13 is a schematic structural diagram of another MN according to an embodiment of the present disclosure.

FIG. 13 is a schematic structural diagram of an MN 13 according to an embodiment of the present disclosure. The MN 13 shown in FIG. 13 may be the MN provided above. The MN 13 may include a memory 1300, a processor 1301, a communications interface 1302, and a bus 1303, and the memory 1300, the processor 1301, and the communications interface 1302 are connected to each other by using the bus 1303. The memory 1300 is configured to store a computer-executable instruction. When the MN 13 runs, the processor 1301 executes the computer-executable instruction stored in the memory 1300, so that the MN 13 performs any handover method provided above. For a specific handover method, refer to the foregoing descriptions and related descriptions in the accompanying drawings. Details are not described herein again.

Figure 14:
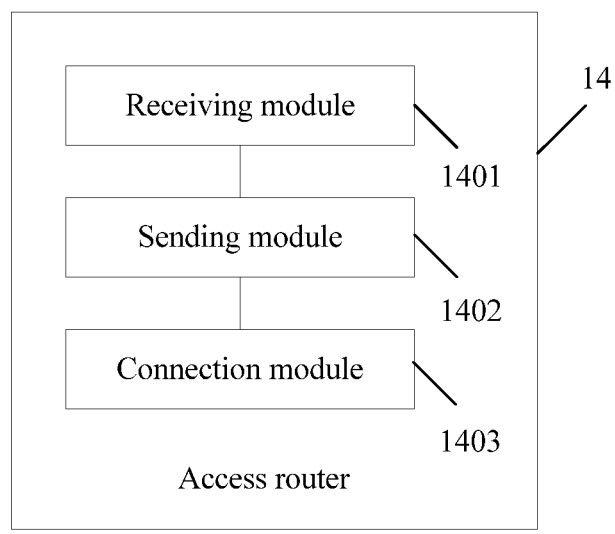
FIG. 14 is a schematic structural diagram of an access router according to an embodiment of the present disclosure.

FIG. 14 is a schematic structural diagram of an access router 14 according to an embodiment of the present disclosure. The access router 14 shown in FIG. 14 may be the PAR provided above. The access router 14 may include a receiving module 1401, a sending module 1402, and a connection module 1403.

The receiving module 1401 is configured to support the access router 14 in performing S11, S14, and S16 in FIGS. 3, S401 and S403 in FIG. 5A and FIG. 5B, and/or another process used for the technology described in this specification. The sending module 1402 is configured to support the access router 14 in performing S15 and S17 in FIGS. 3, S402 and S404 in FIG. 5A and FIG. 5B, and/or another process used for the technology described in this specification. The connection module 1403 is configured to support the access router 14 in performing S21 in FIG. 3, S409 in FIG. 5A and FIG. 5B, and/or another process used for the technology described in this specification. In addition, the access router 14 may further include a storage module. The storage module is configured to store program code and data corresponding to any handover method provided above and performed by the access router 14.

For hardware implementation, the receiving module 1401 may be a receiver, the sending module 1402 may be a transmitter, and the receiver and the transmitter may be integrated together to form a transceiver. The connection module 1403 may be built in or independent of a memory of the access router 14 in a hardware form, so that a processor invokes and performs an operation corresponding to each of the foregoing units.

Figure 15:
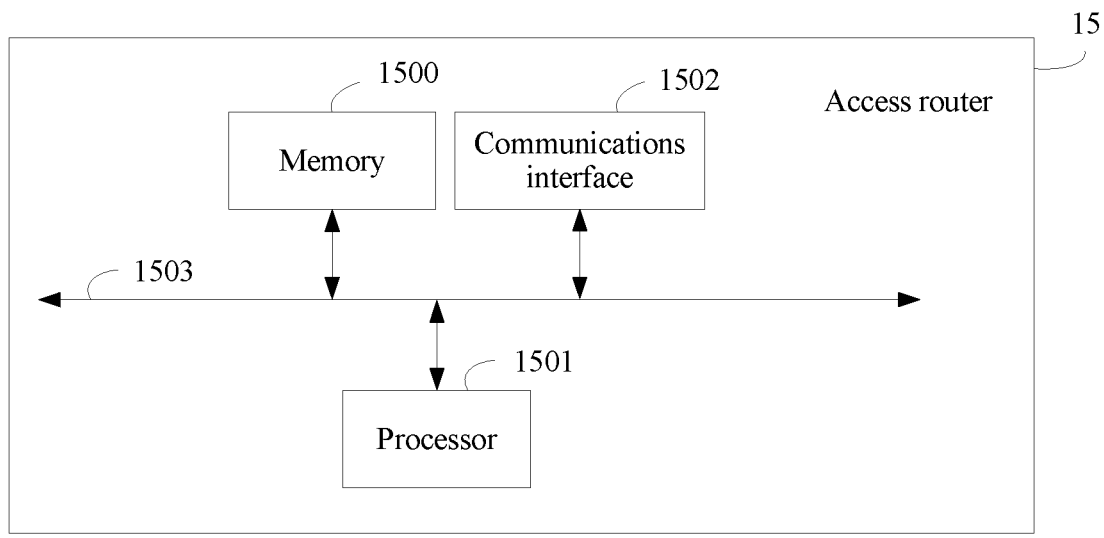
FIG. 15 is a schematic structural diagram of another access router according to an embodiment of the present disclosure.

FIG. 15 is a schematic structural diagram of an access router 15 according to an embodiment of the present disclosure. The access router 15 shown in FIG. 15 may be the PAR provided above. The access router 15 may include a memory 1500, a processor 1501, a communications interface 1502, and a bus 1503, and the memory 1500, the processor 1501, and the communications interface 1502 are connected to each other by using the bus 1503. The memory 1500 is configured to store a computer-executable instruction. When the access router 15 runs, the processor 1501 executes the computer-executable instruction stored in the memory 1500, so that the access router 15 performs any handover method provided above. For a specific handover method, refer to the foregoing descriptions and related descriptions in the accompanying drawings. Details are not described herein again.

Figure 16:
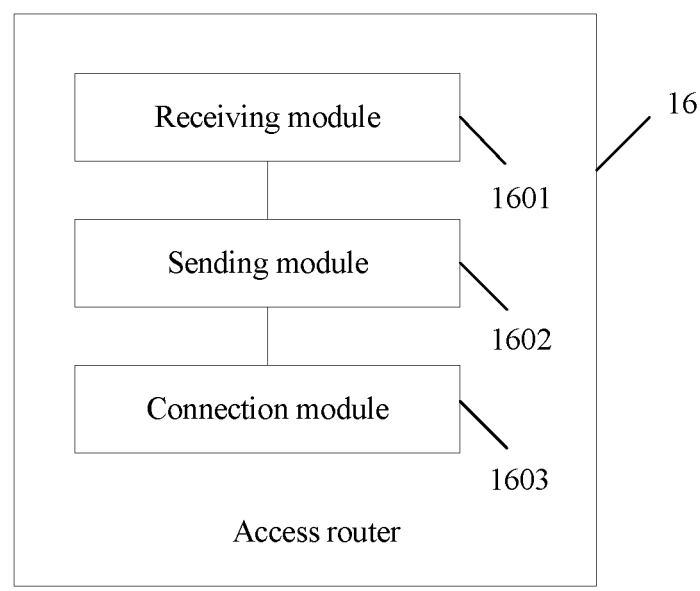
FIG. 16 is a schematic structural diagram of another access router according to an embodiment of the present disclosure.

FIG. 16 is a schematic structural diagram of an access router 16 according to an embodiment of the present disclosure. The access router 16 shown in FIG. 16 may be the NAR provided above. The access router 16 may include a receiving module 1601, a sending module 1602, and a connection module 1603.

The receiving module 1601 is configured to support the access router 16 in performing S15 and S17 in FIG. 3, S402, S404, and S408 in FIG. 5A and FIG. 5B, and/or another process used for the technology described in this specification. The sending module 1602 is configured to support the access router 16 in performing S16 in FIG. 3, S403, S406, and S410 in FIG. 5A and FIG. 5B, and/or another process used for the technology described in this specification. The connection module 1603 is configured to support the access router 16 in performing S22 in FIG. 3, S409 in FIG. 5A and FIG. 5B, and/or another process used for the technology described in this specification. In addition, the access router 16 may further include a storage module. The storage module is configured to store program code and data corresponding to any handover method provided above and performed by the access router 16.

For hardware implementation, the receiving module 1601 may be a receiver, the sending module 1602 may be a transmitter, and the receiver and the transmitter may be integrated together to form a transceiver. The connection module 1603 may be built in or independent of a memory of the access router 16 in a hardware form, so that a processor invokes and performs an operation corresponding to each of the foregoing units.

Figure 17:
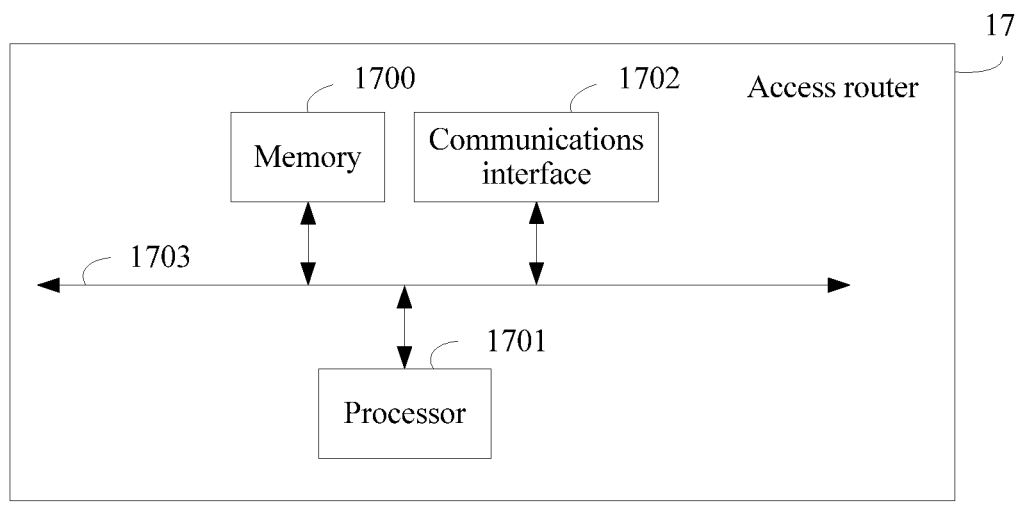
FIG. 17 is a schematic structural diagram of another access router according to an embodiment of the present disclosure.

FIG. 17 is a schematic structural diagram of an access router 17 according to an embodiment of the present disclosure. The access router 17 shown in FIG. 17 may be the NAR provided above. The access router 17 may include a memory 1700, a processor 1701, a communications interface 1702, and a bus 1703, and the memory 1700, the processor 1701, and the communications interface 1702 are connected to each other by using the bus 1703. The memory 1700 is configured to store a computer-executable instruction. When the access router 17 runs, the processor 1701 executes the computer-executable instruction stored in the memory 1700, so that the access router 17 performs any handover method provided above. For a specific handover method, refer to the foregoing descriptions and related descriptions in the accompanying drawings. Details are not described herein again.

Figure 18:
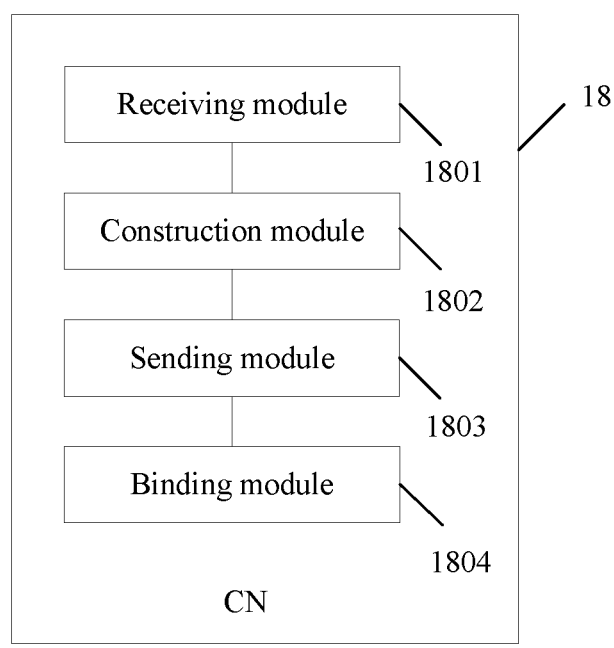
FIG. 18 is a schematic structural diagram of a CN according to an embodiment of the present disclosure.

FIG. 18 is a schematic structural diagram of a CN 18 according to an embodiment of the present disclosure. The CN 18 shown in FIG. 18 may be the CN provided above. The CN 18 may include a receiving module 1801, a construction module 1802, a sending module 1803, and a binding module 1804.

The receiving module 1801 is configured to support the CN 18 in performing S32a and S32c in FIG. 4, S406 in FIG. 5A and FIG. 5B, and/or another process used for the technology described in this specification. The construction module 1802 is configured to support the CN 18 in performing S407 in FIG. 5A and FIG. 5B, and/or another process used for the technology described in this specification. The sending module 1803 is configured to support the CN 18 in performing S32b and S32d in FIG. 4, S408 in FIG. 5A and FIG. 5B, and/or another process used for the technology described in this specification. The binding module 1804 is configured to support the CN 18 in performing S32 in FIG. 3, and S32.1 and S32.2 in FIG. 4, S413 in FIG. 5A and FIG. 5B, and/or another process used for the technology described in this specification. In addition, the CN 18 may further include a storage module. The storage module is configured to store program code and data corresponding to any handover method provided above and performed by the CN 18.

For hardware implementation, the receiving module 1801 may be a receiver, the sending module 1803 may be a transmitter, and the receiver and the transmitter may be integrated together to form a transceiver. The construction module 1802 and the binding module 1804 may be built in or independent of a memory of the CN 18 in a hardware form, so that a processor invokes and performs an operation corresponding to each of the foregoing units.

Figure 19:
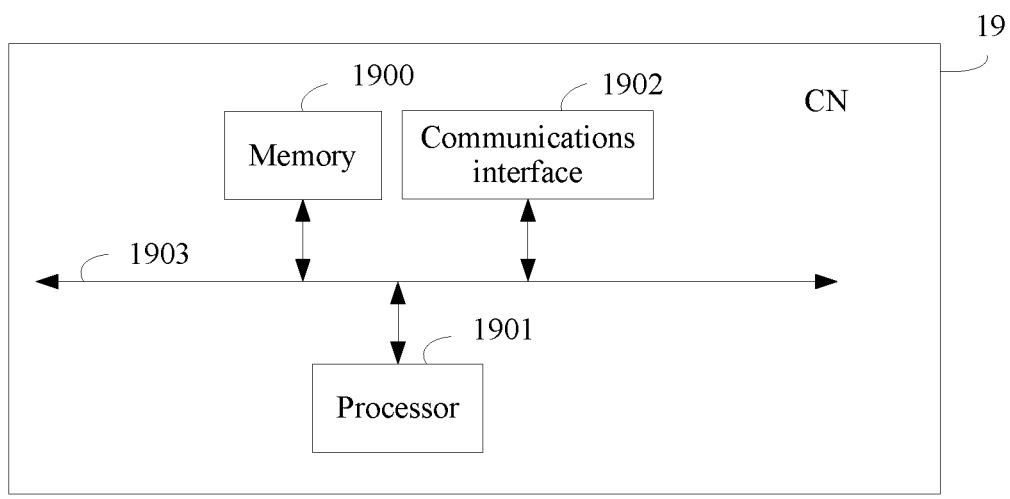
FIG. 19 is a schematic structural diagram of another CN according to an embodiment of the present disclosure.

FIG. 19 is a schematic structural diagram of a CN 19 according to an embodiment of the present disclosure. The CN 19 shown in FIG. 19 may be the CN provided above. The CN 19 may include a memory 1900, a processor 1901, a communications interface 1902, and a bus 1903, and the memory 1900, the processor 1901, and the communications interface 1902 are connected to each other by using the bus 1903. The memory 1900 is configured to store a computer-executable instruction. When the CN 19 runs, the processor 1901 executes the computer-executable instruction stored in the memory 1900, so that the CN 19 performs any handover method provided above. For a specific handover method, refer to the foregoing descriptions and related descriptions in the accompanying drawings. Details are not described herein again.

This embodiment of the present disclosure further provides a storage medium. The storage medium may include a memory. The storage medium may be applied to the MN 13 shown in FIG. 13. In this case, the memory may be the memory 1300 in FIG. 13. Alternatively, the storage medium may be applied to the access router 15 shown in FIG. 15. In this case, the memory may be the memory 1500 in FIG. 15. Alternatively, the storage medium may be applied to the access router 17 shown in FIG. 17. In this case, the memory may be the memory 1700 in FIG. 17. Alternatively, the storage medium may be applied to the CN 19 shown in FIG. 19. In this case, the memory may be the memory 1900 in FIG. 19.

The memory (including the memory 1300, the memory 1500, the memory 1700, and the memory 1900) provided in the embodiments of the present disclosure may include a volatile memory such as a random-access memory (RAM). The memory may alternatively include a non-volatile memory such as a read-only memory (ROM), a flash memory, a hard disk drive (HDD), or a solid-state drive (SSD). The memory may alternatively include a combination of the foregoing types of memories.

The processor provided in the embodiments of the present disclosure may be a processor, or may be a general term of a plurality of processing elements. The processor may be the processor 1301 in FIG. 13. The processor may be the processor 1501 in FIG. 15. The processor may be the processor 1701 in FIG. 17. The processor may be the processor 1901 in FIG. 19. For example, the processor may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. It may implement or execute various example logical blocks, modules, and circuits that are described with reference to the content disclosed in the present disclosure. The general purpose processor may be a microprocessor, or the processor may be any conventional processor, or the like. Alternatively, the processor may be a dedicated processor. The dedicated processor may include at least one of a baseband processing chip, a radio-frequency processing chip, and the like. Further, the dedicated processor may further include a chip having another dedicated processing function in the MN 12, the MN 13, the access router 14, the access router 15, the access router 16, the access router 17, the CN 18, or the CN 19.

The communications interface provided in the embodiments of the present disclosure may be specifically a transceiver on an apparatus. The transceiver may be a wireless transceiver. The communications interface may be the communications interface 1302 in FIG. 13. The communications interface may be the communications interface 1502 in FIG. 15. The communications interface may be the communications interface 1702 in FIG. 17. The communications interface may be the communications interface 1902 in FIG. 19. For example, the wireless transceiver may be an antenna of the apparatus. The processor receives data from or sends data to another device such as a base station by using the communications interface.

The bus provided in the embodiments of the present disclosure may include a data bus, a power bus, a control bus, and a signal status bus. The bus may be the bus 1303 in FIG. 13. The bus may be the bus 1503 in FIG. 15. The bus may be the bus 1703 in FIG. 17. The bus may be the bus 1903 in FIG. 19. In the embodiments, for clear description, various buses are represented by a system bus in FIG. 13, FIG. 15, FIG. 17, and FIG. 19. For ease of indication, the bus is indicated by using only one bold line in FIG. 13, FIG. 15, FIG. 17, and FIG. 19. However, it does not indicate that there is only one bus or only one type of bus.

In a specific implementation process, the operations in the procedure of any handover method provided above may be implemented in a manner in which the processor in a hardware form executes the computer executable instruction that is stored in the memory and that is in a software form. To avoid repetition, no details are provided herein.

A person skilled in the art should be aware that in one or more of the foregoing examples, the functions described in the present disclosure may be implemented by using hardware, software, firmware, or any combination thereof. When this disclosure is implemented by using software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general or dedicated computer.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A handover method, comprising:
  sending, by a mobile node (MN), first instruction information to a new access router (NAR) by using a previous access router (PAR), wherein the first instruction information is used to instruct the NAR to construct a care-of test initialization message and send the care-of test initialization message to a corresponding node (CN), and the care-of test initialization message comprises a new care-of address (NCoA) of the MN and is used to request a care-of keygen token from the CN based on the NCoA;
  obtaining, by the MN, a home address (HoA) authentication parameter from a locally stored binding update list, the HoA authentication parameter being a permanent home keygen token;
  handing over the MN from the PAR to the NAR;
  receiving, by the MN, the care-of keygen token sent by the NAR from the CN; and
  binding the MN with the CN based on the care-of keygen token and the HoA authentication parameter.

2. The method according to claim 1, wherein the sending, by an MN, first instruction information to a NAR by using a PAR comprises:
  sending, by the MN, a fast binding update (FBU) message to the PAR, wherein the FBU message comprises the first instruction information, the FBU message is used to instruct the PAR to send a handover initiate (HI) message to the NAR, and the HI message comprises the first instruction information.

3. The method according to claim 1, wherein the obtaining, by the MN, the HoA authentication parameter is performed before the handing over the MN from the PAR to the NAR.

4. The method according to claim 1, wherein the obtaining, by the MN, an HoA authentication parameter further comprises:
  locally obtaining, by the MN, a Cryptographically Generated Address (CGA) attribute of an HoA, wherein the CGA attribute of the HoA comprises a CGA parameter and a CGA signature; or
  sending, by the MN, a home test initialization message to the CN by using a home agent, and receiving a home test message sent by the home agent from the CN, wherein the home test message comprises a home keygen token.

5. The method according to claim 1,
  wherein the binding update list comprises information about the binding between the MN and the CN.

6. A handover method, comprising:
  receiving, by a previous access router (PAR), first instruction information sent by a mobile node (MN), wherein the first instruction information is used to instruct a new access router (NAR) to construct a care-of test initialization message and send the care-of test initialization message to a corresponding node (CN), and the care-of test initialization message comprises a new care-of address (NCoA) of the MN and is used to instruct the CN to construct a care-of keygen token based on the NCoA;
  sending, by the PAR, the first instruction information to the NAR; and
  disconnecting the PAR from the MN, so that the MN is connected to the NAR, receives the care-of keygen token sent by the NAR, and is further bound with the CN based on the care-of keygen token and a home address (HoA) authentication parameter obtained from a locally stored binding update list, the HoA authentication parameter being a permanent home keygen token.

7. The method according to claim 6, wherein the receiving, by a PAR, first instruction information sent by an MN comprises:
  receiving, by the PAR, a fast binding update (FBU) message sent by the MN, wherein the FBU message comprises the first instruction information; and
  the sending, by the PAR, the first instruction information to the NAR comprises:
  sending, by the PAR, a handover initiate (HI) message to the NAR based on the FBU message, wherein the HI message comprises the first instruction information.

8. A mobile node (MN) apparatus, wherein the MN comprises:

a transmitter to send first instruction information to a new access router (NAR) by using a previous access router (PAR), wherein the first instruction information is used to instruct the NAR to construct a care-of test initialization message and send the care-of test initialization message to a corresponding node (CN), and the care-of test initialization message comprises a new care-of address (NCoA) and is used to instruct the CN to construct a care-of keygen token based on the NCoA;

a processor to switch from a connection to the PAR to a connection to the NAR;

a receiver to receive the care-of keygen token sent by the NAR from the CN, and a home address (HoA) authentication parameter from a locally stored binding update list, the HoA authentication parameter being a permanent home keygen token; and the processor to be bound with the CN based on the care-of keygen token and the HoA authentication parameter.

9. The MN apparatus according to claim 8, wherein the transmitter is to send a fast binding update (FBU) message to the PAR, wherein the FBU message comprises the first instruction information, the FBU message is used to instruct the PAR to send a handover initiate (HI) message to the NAR, and the HI message comprises the first instruction information.

10. The MN apparatus according to claim 8, wherein the HoA authentication parameter is obtained before switching from the connection to the PAR to the connection to the NAR.

11. The MN apparatus according to claim 8, wherein the processor is to:
  locally obtain a Cryptographically Generated Address (CGA) attribute of an HoA, wherein the CGA attribute of the HoA comprises a CGA parameter and a CGA signature; or
  send a home test initialization message to the CN by using a home agent, and receive a home test message sent by the home agent from the CN, wherein the home test message comprises a home keygen token.

12. The MN apparatus according to claim 8, wherein the binding update list comprises information about the binding between the MN and the CN.

\* \* \* \* \*